(12) United States Patent
Song et al.

(10) Patent No.: US 12,645,909 B2
(45) Date of Patent: Jun. 2, 2026

(54) MULTIFUNCTIONAL SOFT DIODE FOR ARTIFICIAL SYSTEMS

(71) Applicant: BOARD OF REGENTS, THE UNIVERSITY OF TEXAS SYSTEM, Austin, TX (US)

(72) Inventors: Wen Song, Austin, TX (US); Thomas C. Underwood, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 406 days.

(21) Appl. No.: 18/194,068

(22) Filed: Mar. 31, 2023

(65) Prior Publication Data

US 2023/0316038 A1 Oct. 5, 2023

Related U.S. Application Data

(60) Provisional application No. 63/326,489, filed on Apr. 1, 2022.

(51) Int. Cl.
    *G06N 3/008* (2023.01)
(52) U.S. Cl.
    CPC .................................... *G06N 3/008* (2013.01)
(58) Field of Classification Search
    CPC ...................................................... G06N 3/008
    See application file for complete search history.

(56) References Cited

U.S. PATENT DOCUMENTS

2014/0130920 A1* 5/2014 Fernandes ............... G06F 30/18
                                                          137/832

OTHER PUBLICATIONS

Rothemund, Philipp, et al. "A soft, bistable valve for autonomous control of soft actuators." *Science Robotics* 3.16 (2018): eaar7986.

* cited by examiner

*Primary Examiner* — Miranda M Huang
(74) *Attorney, Agent, or Firm* — pH IP Law

(57) ABSTRACT
Artificial material systems that seek to mimic the basic processes of life must perform multiple complex functions including responsiveness, motion, and metabolism. Networks of programmable materials offer a pathway toward achieving these functions by altering local chemical, physical, and structural properties to enable control. We demonstrate the ability to perform multiple complex functions in a single soft elastomeric material system by reconfiguring, in situ, passive bistable fluidic diodes that are inspired by mammalian venous valves. We show how pneumo-mechanical programmability allows these silicone elastomer diode assemblies to accomplish, without rearranging the fluidic circuit, multiple functions including pumping (motion), energy storage/discharge (metabolism), logic operations (response), and signal filtering/rectification. The ability to achieve multiple functions through in situ programming may lead to the development of efficient artificial systems capable of complex functions in compact, remote applications.

25 Claims, 15 Drawing Sheets
(15 of 15 Drawing Sheet(s) Filed in Color)

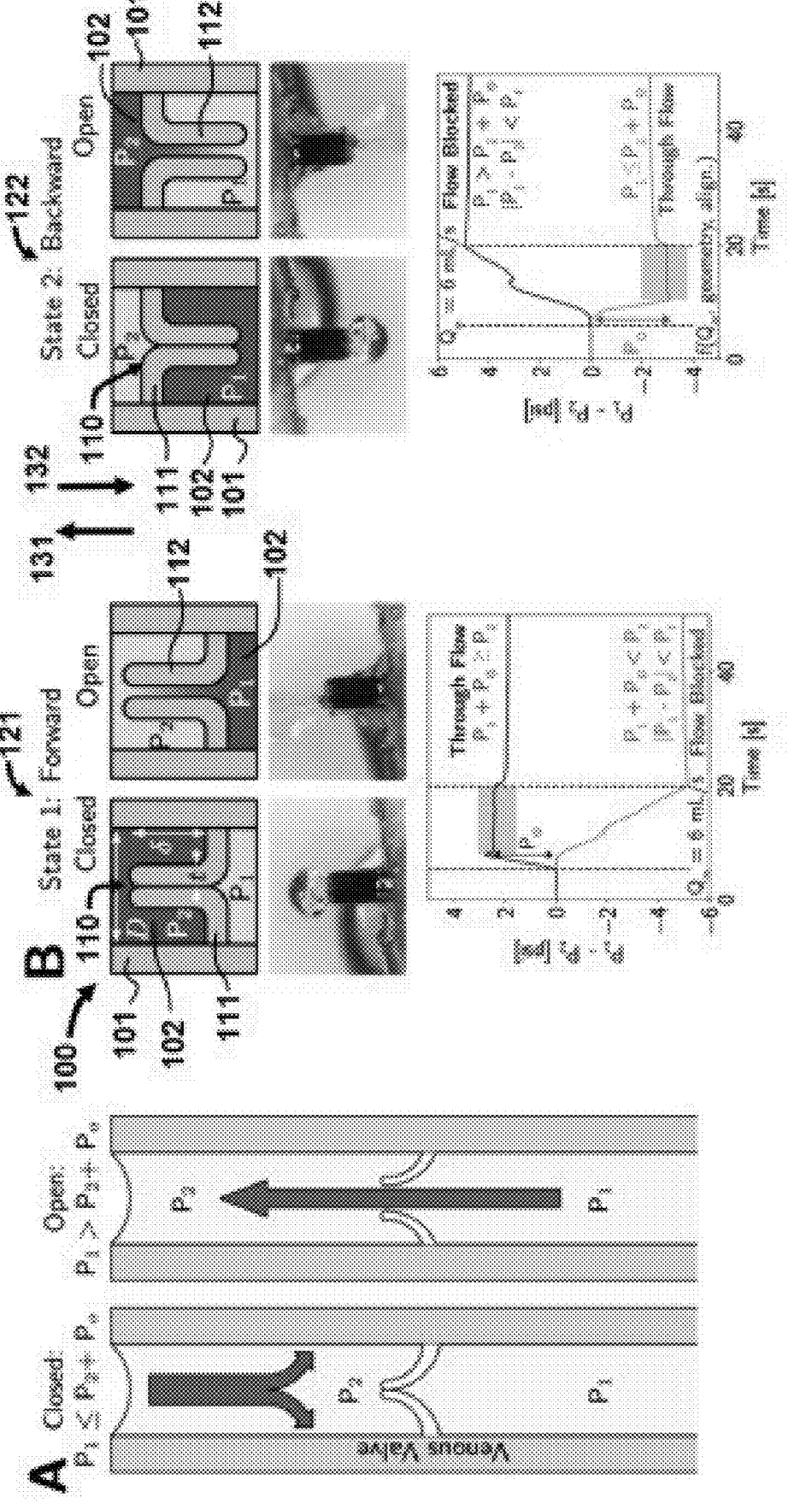
FIGS. 1A-B

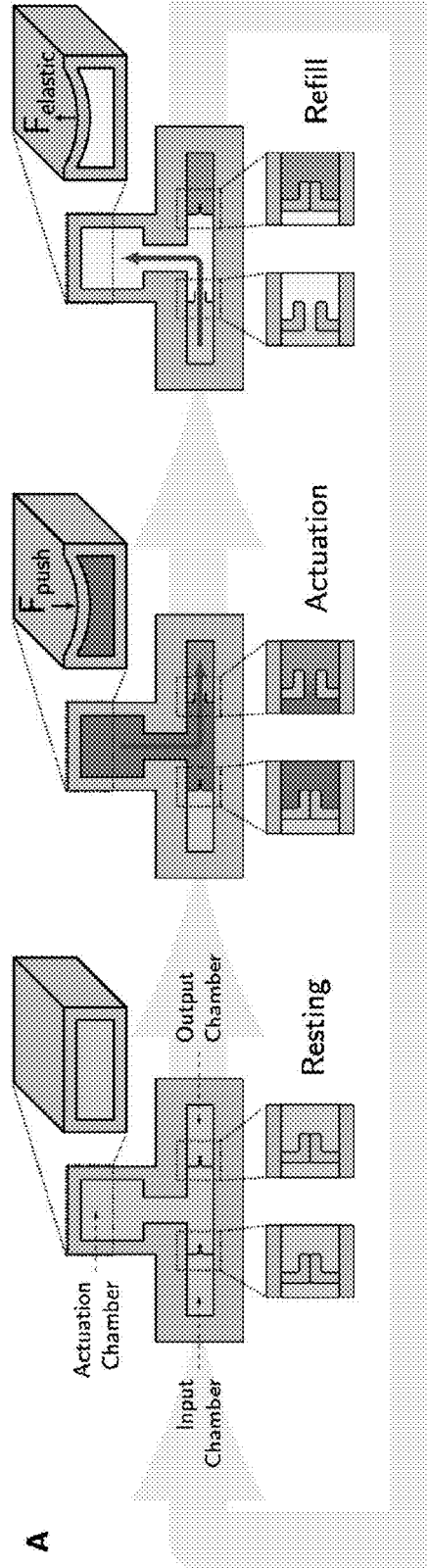
FIG. 2A
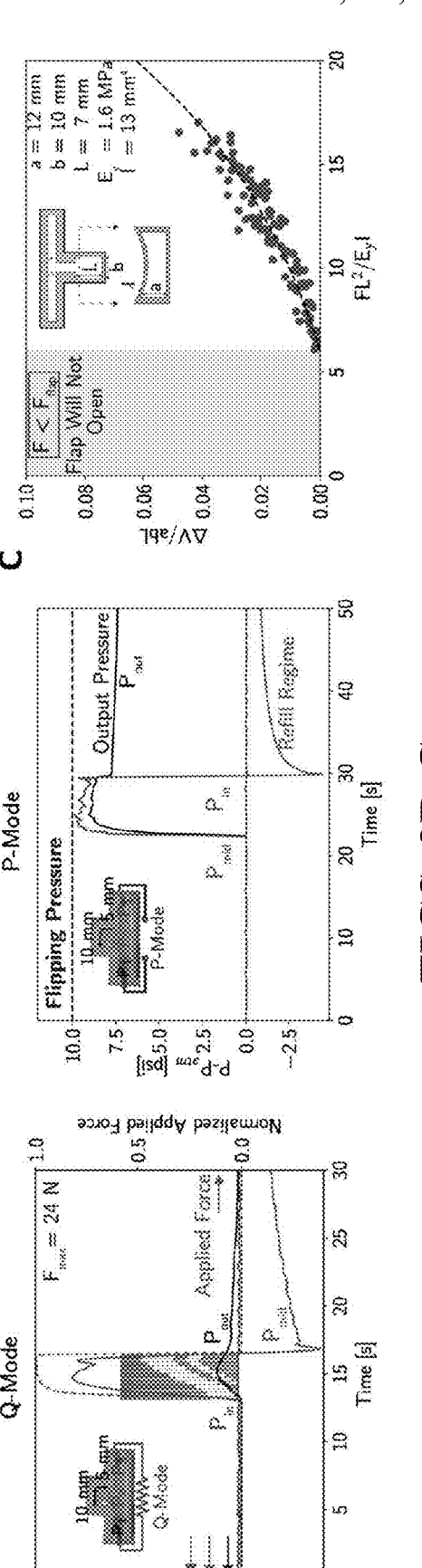
FIGS. 2B-C

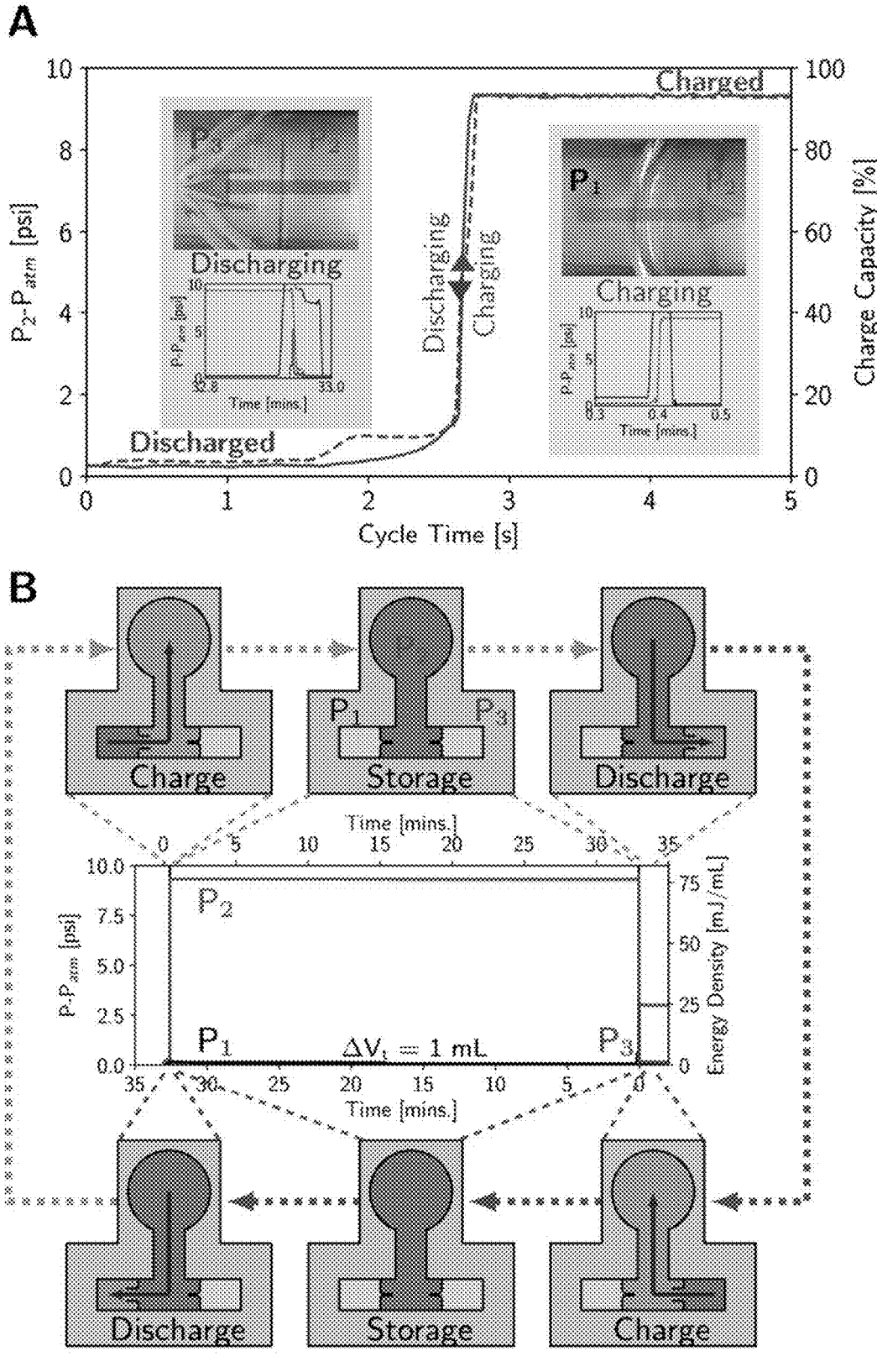
FIGS. 3A-B

FIG. 4B

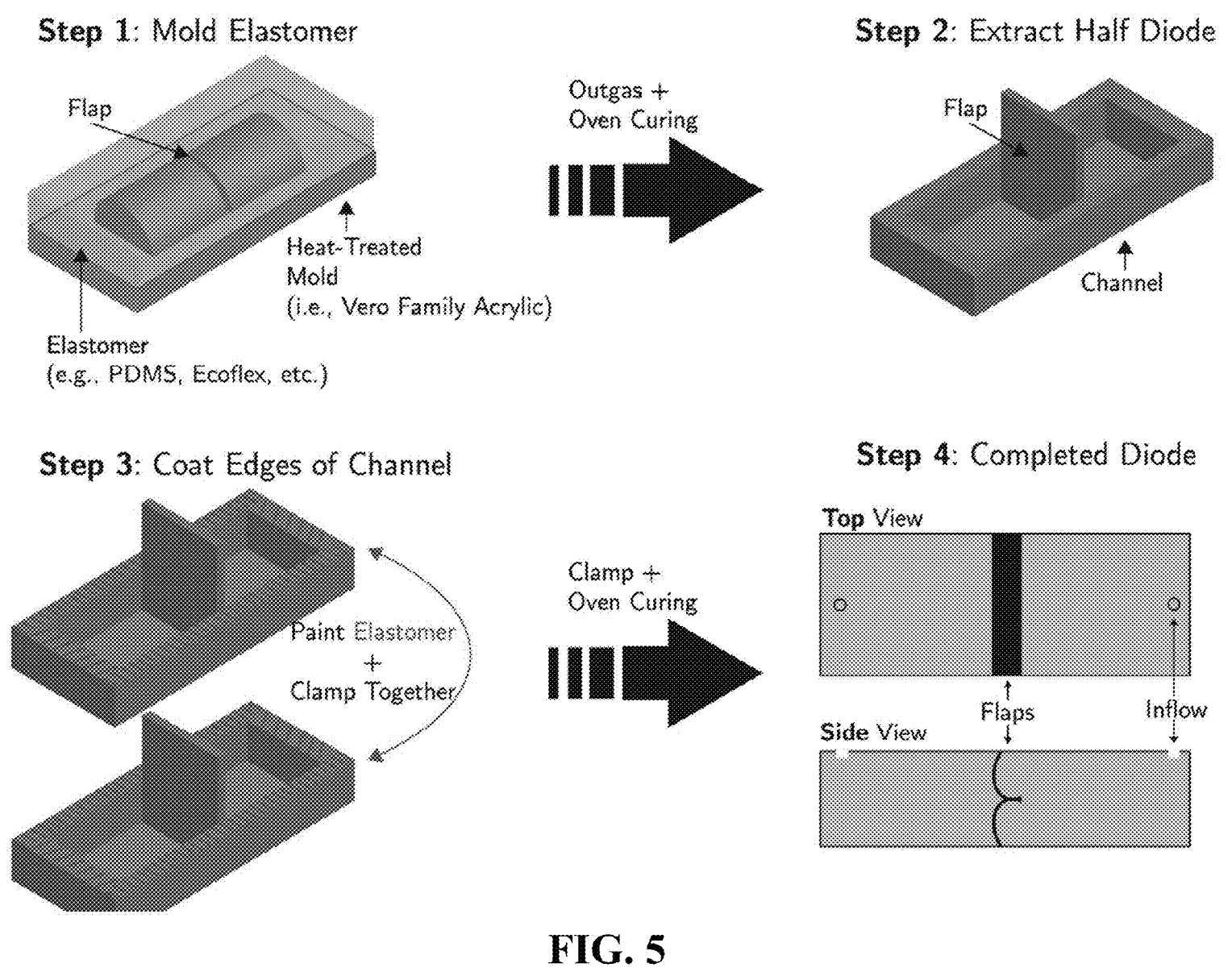

Step 1: Mold Elastomer

Flap

Heat-Treated Mold (i.e., Vero Family Acrylic)

Elastomer (e.g., PDMS, Ecoflex, etc.,)

Outgas + Oven Curing

Step 2: Extract Half Diode

Flap

Channel

Step 3: Coat Edges of Channel

Paint Elastomer + Clamp Together

Clamp + Oven Curing

Step 4: Completed Diode

Top View

Inflow

Flaps

Side View

FIG. 5

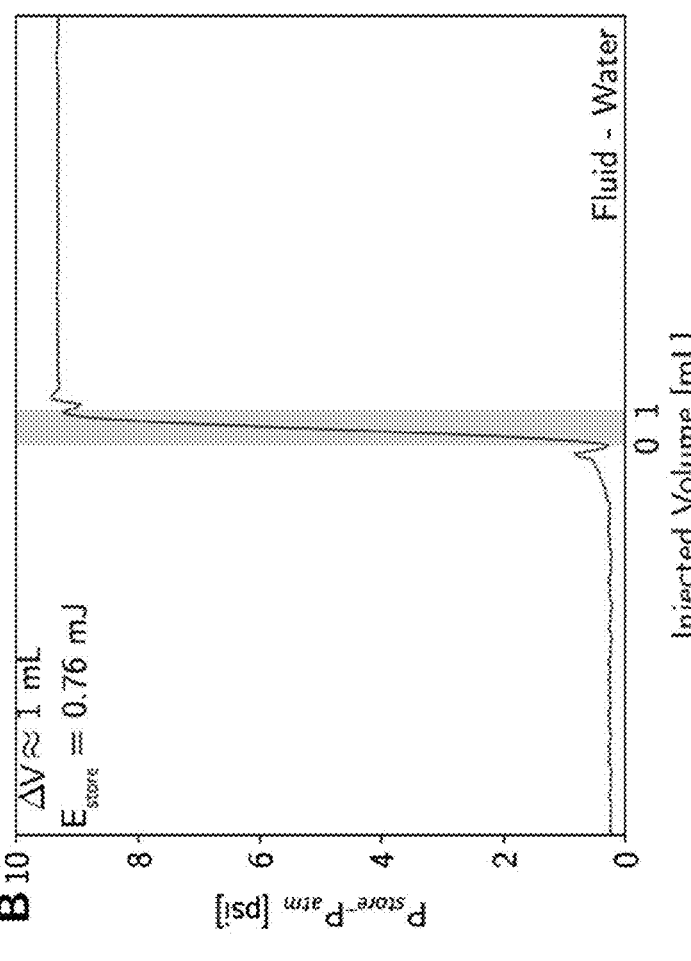
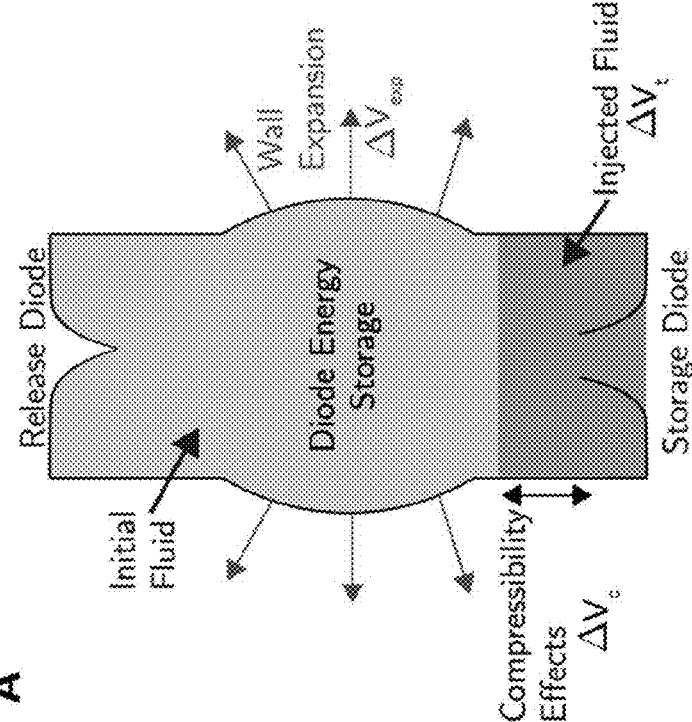
FIGS. 9A-B

MULTIFUNCTIONAL SOFT DIODE FOR ARTIFICIAL SYSTEMS

CROSS-REFERENCE TO RELATED APPLICATIONS

This application claims priority to U.S. Provisional Patent Application Ser. No. 63/326,489 filed Apr. 1, 2022, the entire contents of which are incorporated herein by reference.

BACKGROUND INFORMATION

Programmable materials describe a class of objects that are capable of changing their form, function, or state on demand. These materials use a combination of physical and chemical properties to sense their environment and regulate a desired behavior (i.e., a form of control) (1). Examples range from self-assembly on the micro and nanoscale (e.g., biochemical sensors, colloids, etc.) (2-4) to the change of shape or structure of devices on the macroscale (e.g., origami, crystallization, etc.) (5, 6). In either case, these systems typically study how assemblies of simple components can be integrated to yield a single programmable function (e.g., shape change, pattern formation, etc.) (7-10). One strategy to enable the design of new and more complex classes of material systems is to utilize multi-functional components that can be assembled to compute, actuate (e.g., propulsion), and store energy depending on their configuration.

The control of material systems requires programmable functions that can organize and regulate a desired behavior. Networks of soft assemblies (e.g., components) offer a reconfigurable and collective means for control using a combination of localized chemical, physical, and structural properties.

Programmable materials are currently unable to mimic the complex behaviors of living systems that require switching between responsiveness, motion, and metabolism. Multifunctional programmability offers a method for material systems to enable complex artificial behaviors with efficiency, compactness, and modularity.

SUMMARY

Exemplary embodiments of the present disclosure include a soft, passive bistable valve that enables network assembly for mechanically programmable logic, pumping, and energy storage as described herein.

Exemplary embodiments of the present disclosure demonstrate how network assemblies of a simple, passive bistable fluidic diode can be configured and mechanically programmed to implement multiple functions including actuation (pumping), computing (logic), and energy storage. These functions can be reconfigured on demand to improve control, enable complex functions, and achieve artificial life at the human scale.

Exemplary embodiments include a passive and entirely soft diode assembly that can functionally regulate fluid flow using two distinct and reconfigurable states. Each stable state is inspired by venous valves in mammalian vasculature to enable operation without an external energy input while retaining memory of its configuration (i.e., rectification direction), but is distinct in form and function wherein the two separate valve leaflets enable bidirectional stability. We show how these soft diodes can be assembled into mechanically programmable pumps, logic arrays, and controllably store and release energy. These elements illustrate a design strategy by which complex functionality of architectured material systems can be engineered using programmable sub-assemblies.

Exemplary embodiments of the device are entirely soft and enables, for the first time, passive bistability (i.e., does not require energy input to operate). The bistability enables the device to exist in two distinct and stable states that can be reconfigured on-demand. Exemplary embodiments can be configured in networks to enable mechanically programmable behavior depending on the state each diode is in. This programmatic behavior enables embedded control of autonomous systems for the first time. Exemplary embodiments can be assembled in networks to enable mechanically programmable soft logic, pumping and energy storage. Each of these functions can be programmed based on the configuration of individual diodes (each of which can be reconfigured on demand). Other devices cannot offer these reconfigurable functions that can be programmed on demand. Exemplary embodiments have mechanical memory (i.e., elastic hysteresis) that enables it to retain its configuration without the supply of external memory. This is a form of read-only memory that other soft or hard devices do not have. Exemplary embodiments can enable components of a soft computer or embedded control system including computation, actuation, and energy storage using a single passive component.

Exemplary embodiments also show how a single modular device can programmatically switch between different functionalities depending on its configuration. In addition, exemplary embodiments demonstrate how feedback and computational tasks can be performed without a source of energy. Furthermore, exemplary embodiments demonstrate a component that can enable soft, autonomous systems. The same component can be programmatically assembled to compute, actuate (e.g., propulsion), and store energy depending on their configuration. Each of these are advancements of the state-of-the-art in autonomous and soft systems. Exemplary embodiments also include bistability in the device (i.e., the state or valve orientation of the diode) that enables memory to be retained without access to a supply of energy. This is distinct from traditional electronic circuitry.

Exemplary embodiments are passive and do not require external energy to operate. In addition, exemplary embodiments offer hysteric "memory" and can retain its configuration without an external energy source. Exemplary embodiments are fully soft and are reconfigurable between two stable states. Exemplary embodiments can be assembled in networks to enable programmable multi-functionality (i.e., computation, actuation, and energy storage). Together these functions make up components of an autonomous soft computer.

Exemplary embodiments can sense the environment through pressure fluctuations. Exemplary embodiments could integrate hydrogels in the diode or channels that can change their shape in response to environmental conditions (e.g., temperature, pH, etc.). This would allow remote sensing using passive, inexpensive (cost of elastomeric materials), and modular components. Exemplary embodiments can be massively produced for wide deployment in e.g. autonomous robotics, underwater systems, robotics in extreme environments (space, radiation/nuclear reactors, or environments that conventional electronics fail), soft/hard robotic interfaces (gripping packages, handling fragile components, etc.), remote sensing, or bioengineering.

Exemplary embodiments currently explore different elastomeric materials based on their elasticity. Widespread distributed sensing using the device could include environmentally friendly and biodegradable polymers, which could be used in place of PDMS in certain embodiments.

Exemplary embodiments confirm that soft, bistable components can enable multi-functional behavior. Combining unique elastomeric states with passive flow control allow diodes to programmatically switch between computing, actuating, and storing energy depending on how they are assembled. It is believed the modular design and passive nature of the soft diode can enable new classes of programmable materials that can offer improved control and more complex functionality. This form of modular hardware could be a way to extend the form, function, and impact of programmable materials from the micro and nanoscale to the human scale. For instance, soft diodes could be integrated in biomedical devices to regulate the delivery of a reagent. Diodes also offer the broader possibility of enabling an integrated "computer" in materials systems where the control of logic, reflexes, actuators, and storage of energy can be done internal to a system boundary.

Exemplary embodiments include a passive and entirely soft diode assembly that can functionally regulate fluid flow using two distinct and reconfigurable states. Each state is inspired by vascular networks in the human body (e.g., valves in normal and varicose veins) to enable operation without an external energy input while retaining memory of its configuration (i.e., rectification direction). We show how these soft diodes can be assembled into mechanically programmable pumps, logic arrays, and controllably store and release energy. These elements illustrate a design strategy by which complex functionality of architectured material systems can be engineered using programmable sub-assemblies.

Exemplary embodiments include a system composed of soft diode assemblies that use a combination of microfluidics, elastic deformation, and bistability to enable programmable multi-functional behavior. Each diode is soft and bistable which allows it to exist in two distinct states and dynamically switch between them. This function allows material systems to be mechanically programmed (i.e., locally flipping a valve) to enable different functionalities after they are assembled. For instance, two diodes that are assembled in series (with the same valve orientation) can be used to form a pump and drive the displacement of a fluid. Flipping the direction of a single valve can transform the function of the assembly to storing energy. Cascading a second layer of diodes can form elementary logic gates (AND, OR) while isolated diodes can filter the flow of a fluid (i.e., information). Together these functions, including elements of computation, actuation, and energy storage, make up components of behavior and control in complex systems. Each function can be defined locally by controlling the orientation of individual diodes.

Certain embodiments include a system comprising: a chamber comprising a fluid, and a valve disposed within the chamber, wherein: the valve comprises a first flexible member; the valve comprises a second flexible member; the first flexible member and the second flexible member are configured to move from a first position to a second position; in the first position the first flexible member and the second flexible member are configured to permit fluid flow in a first direction and to restrict fluid flow in a second direction; in the second position the first flexible member and the second flexible member are configured to permit fluid flow in the second direction and to restrict fluid flow in the first direction; and the first flexible member and the second flexible member are configured to remain in the first position or the second position without an external energy input.

In particular embodiments, the first flexible member and the second flexible member form a first overlap in the first position. In some embodiments, the first flexible member and the second flexible member are configured to move from the first position to the second position upon application of a first pressure gradient of the fluid antiparallel to the first overlap. In specific embodiments, the first flexible member and the second flexible member form a second overlap in the second position.

In certain embodiments, the first flexible member and the second flexible member are configured to move from the second position to the first position upon application of a second pressure gradient of the fluid antiparallel to the first overlap. In particular embodiments, the valve is a first valve; and the system comprises a second valve disposed within the chamber; the second valve comprises a third flexible member; the second valve comprises a fourth flexible member; the third flexible member and the fourth flexible member are configured to move from a third position to a fourth position; in the third position the third flexible member and the fourth flexible member are configured to permit fluid flow in a first direction and to restrict fluid flow in a second direction; in the fourth position the third flexible member and the second flexible member are configured to permit fluid flow in the second direction and to restrict fluid flow in the first direction; and the third flexible member and the fourth flexible member are configured to remain in the third position or the fourth position without an external energy input.

In some embodiments, the chamber is an input-output chamber; and the system comprises an actuation chamber in fluid communication with the input-output chamber. In specific embodiments, the actuation chamber is configured to move the first flexible member and the second flexible member back and forth between the first position and the second position; and the actuation chamber is configured to move the third flexible member and the fourth flexible member back and forth between the third position and the fourth position. In certain embodiments, the actuation chamber is configured to move the first flexible member and the second flexible member back and forth between the first position and the second position via a pressure change of the fluid between the actuation chamber and the input-output chamber; and the actuation chamber is configured to move the third flexible member and the fourth flexible member back and forth between the third position and the fourth position via the pressure change of the fluid between the actuation chamber and the input-output chamber.

In particular embodiments, the first flexible member extends more than halfway across the chamber; and the second flexible member extends more than halfway across the chamber. In some embodiments, the third flexible member extends more than halfway across the chamber; and the fourth flexible member extends more than halfway across the chamber. In specific embodiments, the first flexible member and the second flexible member form a first overlap in the first position. In certain embodiments, the first flexible member and the second flexible member are configured to move from the first position to the second position upon application of a first pressure gradient of the fluid antiparallel to the first overlap. In particular embodiments, the first flexible member and the second flexible member form a second overlap in the second position. In some embodiments, the first flexible member and the second flexible member are configured to move from the second position to the first position upon application of a second pressure gradient of the fluid antiparallel to the first overlap.

Certain embodiments include a method of controlling a flow of a fluid in a circuit, wherein: the circuit comprises a plurality of valves, each comprising a first flexible member and a second flexible member configured to move from a first position to a second position; each of the plurality of valves are configured to permit fluid flow in a first direction when the first flexible member and second flexible member are in the first position; each of the plurality of valves are configured to permit fluid flow in a second direction when the first flexible member and second flexible member are in the second position; the plurality of valves are each configured to remain in the first position or the second position without an external energy input; the first flexible member and the second flexible member of each of the plurality of valves form an overlap in each of the plurality of valves; and the flow of the fluid in the circuit is controlled by applying a pressure gradient of the fluid antiparallel to overlap in one or more of the plurality of valves.

In particular embodiments, the plurality of valves comprises a first valve and a second valve; the first valve is located in a first input channel; the second valve is located in a second input channel; the first input channel and the second input channel are in fluid communication with an output channel. In some embodiments, fluid flow in the output channel is permitted if the first valve is configured to permit fluid flow from first input channel to the output channel or if the second valve is configured to permit fluid flow from the second input channel to the output channel. Specific embodiments further comprise changing the configuration of either the first valve or the second valve such that fluid flow in the output channel is only permitted if both the first valve is configured to permit fluid flow from first input channel to the output channel and if the second valve is configured to permit fluid flow from the second input channel to the output channel.

In certain embodiments changing the configuration of either the first valve or the second valve comprises moving the first flexible member and the second flexible member of either the first valve or the second valve from the first position to the second position. In particular embodiments, the first flexible member and the second flexible member of either the first valve or the second valve form overlap; and moving the first flexible member and the second flexible member of either the first valve or the second valve from the first position to the second position comprises applying a pressure gradient of the fluid antiparallel to the overlap. In some embodiments, fluid flow in the output channel is only permitted if both the first valve is configured to permit fluid flow from first input channel to the output channel and if the second valve is configured to permit fluid flow from the second input channel to the output channel. Specific embodiments further comprise changing the configuration of either the first valve or the second valve such that fluid flow in the output channel is permitted if the first valve is configured to permit fluid flow from first input channel to the output channel or if the second valve is configured to permit fluid flow from the second input channel to the output channel.

In certain embodiments, changing the configuration of either the first valve or the second valve comprises moving the first flexible member and the second flexible member of either the first valve or the second valve from the first position to the second position. In particular embodiments, the first flexible member and the second flexible member of either the first valve or the second valve form overlap; and moving the first flexible member and the second flexible member of either the first valve or the second valve from the first position to the second position comprises applying a pressure gradient of the fluid antiparallel to the overlap.

In the present disclosure, the term "coupled" is defined as connected, although not necessarily directly, and not necessarily mechanically.

The use of the word "a" or "an" when used in conjunction with the term "comprising" in the claims and/or the specification may mean "one," but it is also consistent with the meaning of "one or more" or "at least one." The terms "approximately, "about" or "substantially" mean, in general, the stated value plus or minus 10%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will be apparent to those skilled in the art from this detailed description.

BRIEF DESCRIPTION OF THE FIGURES

The patent or application file contains at least one drawing executed in color. Copies of this patent or patent application publication with color drawing(s) will be provided by the Office upon request and payment of the necessary fee.

The following drawings form part of the present specification and are included to further demonstrate certain aspects of the present disclosure. The invention may be better understood by reference to one of these drawings in combination with the detailed description of specific embodiments presented herein.

FIGS. 1A-D show a programmable soft diode that enables multifunctional design according to exemplary embodiments of the present disclosure.

FIGS. 2A-D show a programmable soft pump using two reconfigurable diodes in series according to exemplary embodiments of the present disclosure.

FIGS. 3A-C show cycling between storing and dispensing energy using the two diodes in series according to exemplary embodiments of the present disclosure.

FIGS. 4A-B show reconfigurable digital logic using two soft diodes in parallel according to exemplary embodiments of the present disclosure.

FIG. 5 shows fabrication procedure used to manufacture soft diodes according to exemplary embodiments of the present disclosure.

FIGS. 9A-B show a depiction of energy storage using soft diodes and measured P-V diagram of the charging process according to exemplary embodiments of the present disclosure.

Figure 1C:
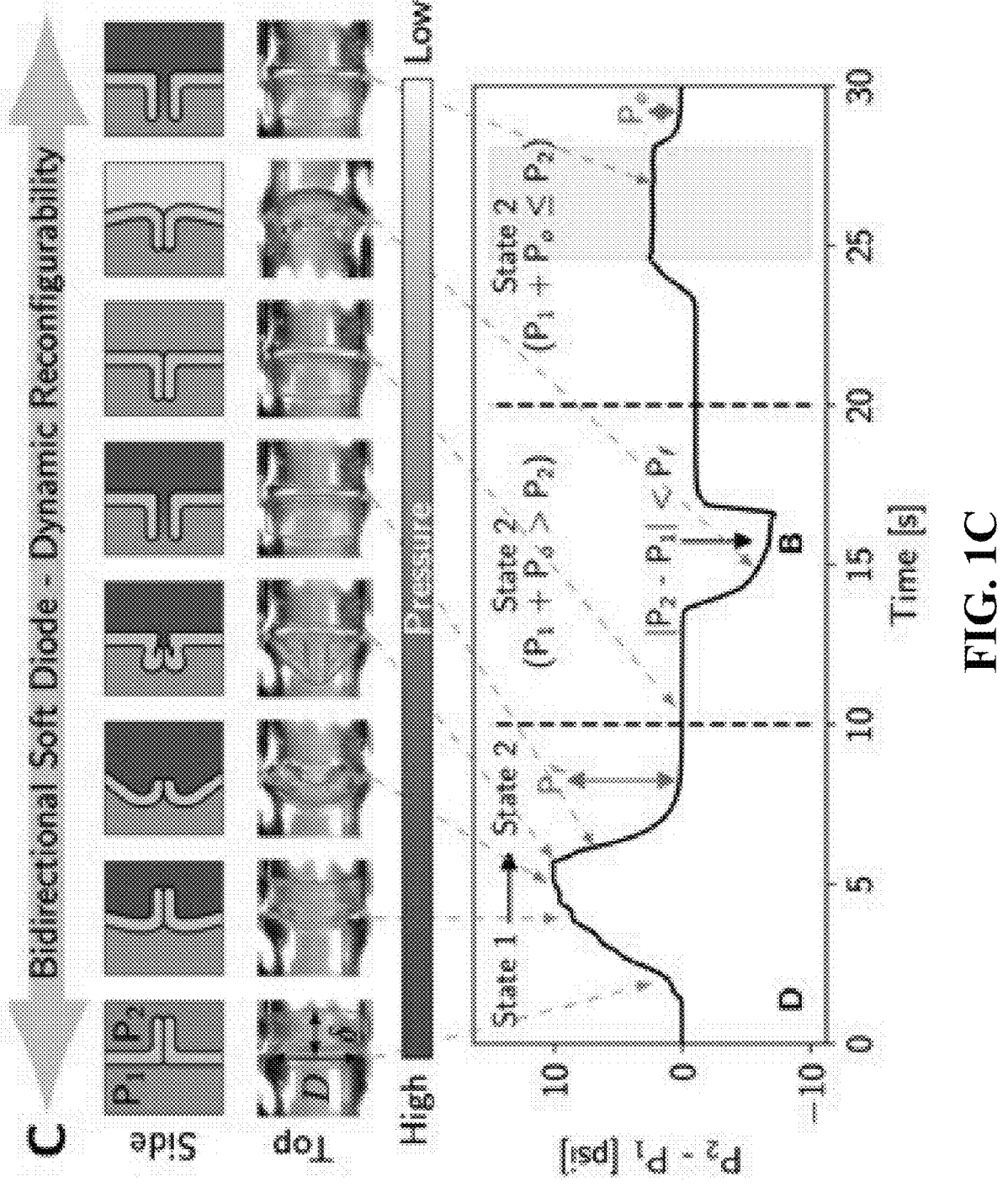

DETAILED DESCRIPTION OF EXEMPLARY
EMBODIMENTS

1. Introduction

The ability for simple nucleotides to assemble into complex, multifunctional genetic instructions offers inspiration for designing new classes of functional materials that aim to mimic life.[1] Current approaches to achieve motion, responsiveness, and metabolism leverage programmable materials that change their form, function, or state on demand.[2] These materials use a combination of physical and chemical properties to sense their environment and regulate a desired behavior (i.e., exert a form of control).[3] Currently, reconfigurable matter (i.e., components) carry out predefined actions (e.g., shape change[4-7], self-assembly[3,8,9], pattern formation[10-12]) to perform a specialized function. Mimicry of complex life (e.g., integrated artificial responsiveness, motion, and metabolism), therefore, relies on collaboration between many such specialized components—integrating the multitudinous components is a complex task that leads to system inefficiency (i.e., high energy expenditure, lack of compactness and modularity) and/or simplicity in function. To enable complex artificial life, a new design strategy is required where networks of simple, passive components can be assembled, reconfigured, and programmed on-demand to perform multiple functions.

Here, we demonstrate a set of multifunctional and programmable behaviors that are enabled by network assemblies of simple, passive bidirectional fluidic diodes (i.e., one-way valves) in which flow is regulated, without external energy input, in two opposing orientations. The passive characteristic of the soft diode component maximizes the energy efficiency of the system (i.e., no parasitic loads), while first-of-a-kind programmable bidirectionality (i.e., switchability between two distinct states, FIG. 1) enables multifunction, simplicity, and modularity in design.

FIG. 1 illustrates a programmable soft diode that enables multifunctional design. FIG. 1A illustrates a design of the diode is inspired by venous valves in the human vasculature, where tissue leaflets form one-way valves to prevent backflow of blood. Referring to FIG. 1B, in one embodiment of the present disclosure, a system 100 comprises a chamber 101 comprising a fluid 102 and a valve 110 disposed within chamber 101. For purposes of clarity, not all elements are labeled with reference numbers in each view of system 100 in FIG. 1B. In the illustrated embodiment, valve 110 comprises a first flexible member 111 and a second flexible member 112. First flexible member 111 and second flexible member 112 are configured to move from a first position 121 to a second position 122. In first position 121 first flexible member 111 and second flexible member 112 are configured to permit fluid flow in a first direction 131 and to restrict fluid flow in a second direction 132. In second position 122, first flexible member 111 and second flexible member 112 are configured to permit fluid flow in second direction 132 and to restrict fluid flow in first direction 131. First flexible member 111 and second flexible member 112 are configured to remain in first position 121 or second position 122 without an external energy input.

Figure 1D:
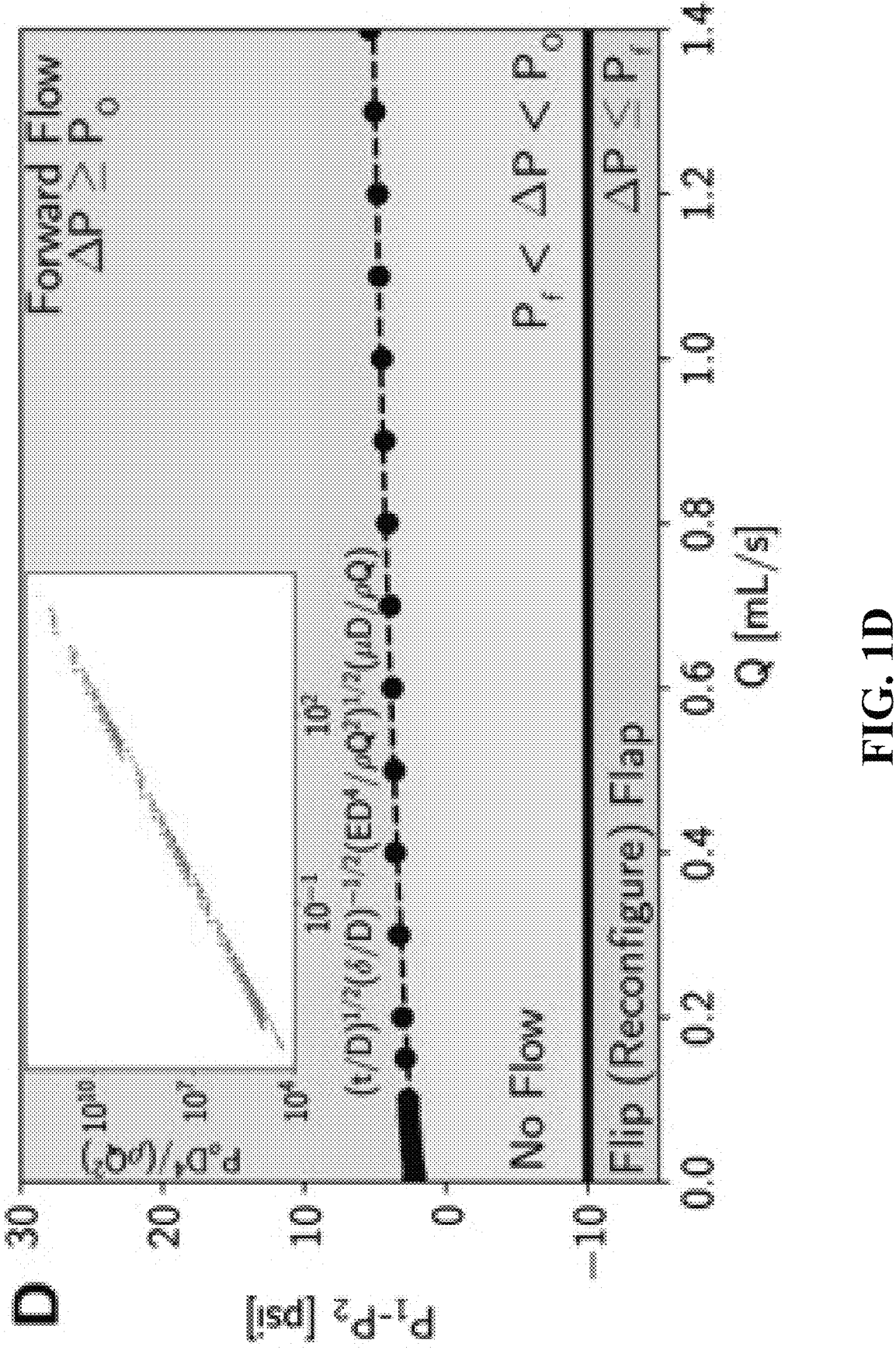

FIG. 1B illustrates the diode is stable in two states and rectifies flow in a similar fashion as venous valves in each state. FIG. 1C illustrates that unlike venous valves, the diode is reconfigurable between the two stable states by imposing a pressure gradient in the direction opposing the valve leaflets ($P_f$). Stability in each state allows the diode to retain its configuration without an external supply of energy. FIG. 1D illustrates three regimes are defined for information transfer through the bidirectional valve: forward flow (green, pressure signal is transmitted), no flow (orange, pressure signal is obstructed), and reconfiguration (blue) where the valve leaflet direction is reversed. Nondimensionalization of the open pressures ($P_o$) show that the modulatory characteristics of the valve depend on the leaflet dimensions (t, δ), channel geometry (D), fluid properties (Q, ρ, μ), and material elasticity ($E_y$) of the device (inset, each data point represents at least 3 trials).

Figure 2D:
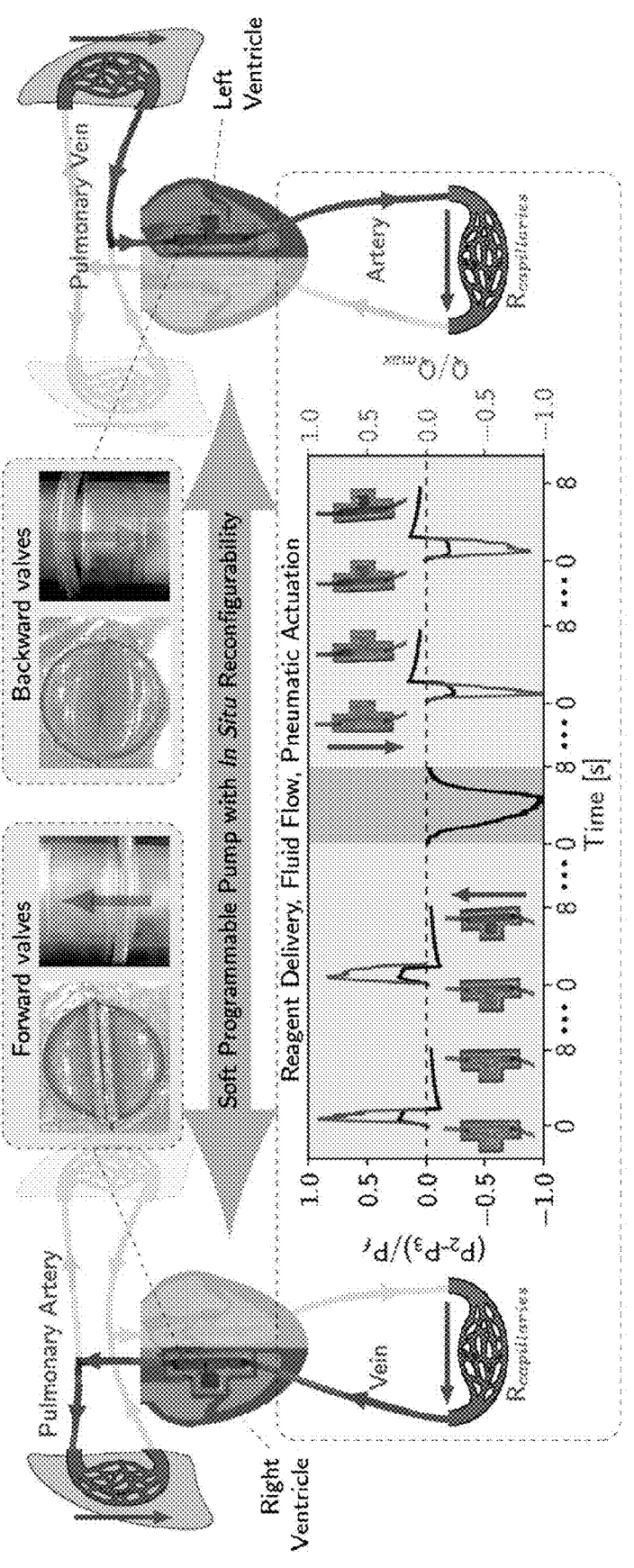

FIG. 2 illustrates a programmable soft pump using two reconfigurable diodes in series. FIG. 2A illustrates a schematic actuation of the soft pump, where compression of the actuation chamber (actuation) pressurizes the enclosed fluid to force flow out of the downstream valve and close the upstream valve, and release of the actuation chamber (refill) draws a vacuum within the chamber to allow flow in from the upstream valve and closes the downstream valve. FIG. 2B illustrates two modes of operation, rate (Q-mode) and pressure (P-mode) control, are possible depending on the connected fluidic load (i.e., resistance). FIG. 2C illustrates dimensionless characterization of the displacement fluid volume, ΔV, as a function of the actuation chamber geometry (a, b, L), elasticity, $E_y$, and applied force, F. FIG. 2D illustrates a reconfigured pump operating in two directions, like the left and right sides of mammalian hearts. Pressure signals resulting from pump actuation resemble those from electrocardiograms of the heart. Pressure pulses ($P_2$-$P_3$) are normalized to the flipping pressure ($P_f$) required to reverse the direction of the valves, and resulting flow rates are normalized to the maximum flow rates measured $Q_{max}$.

Figure 3C:
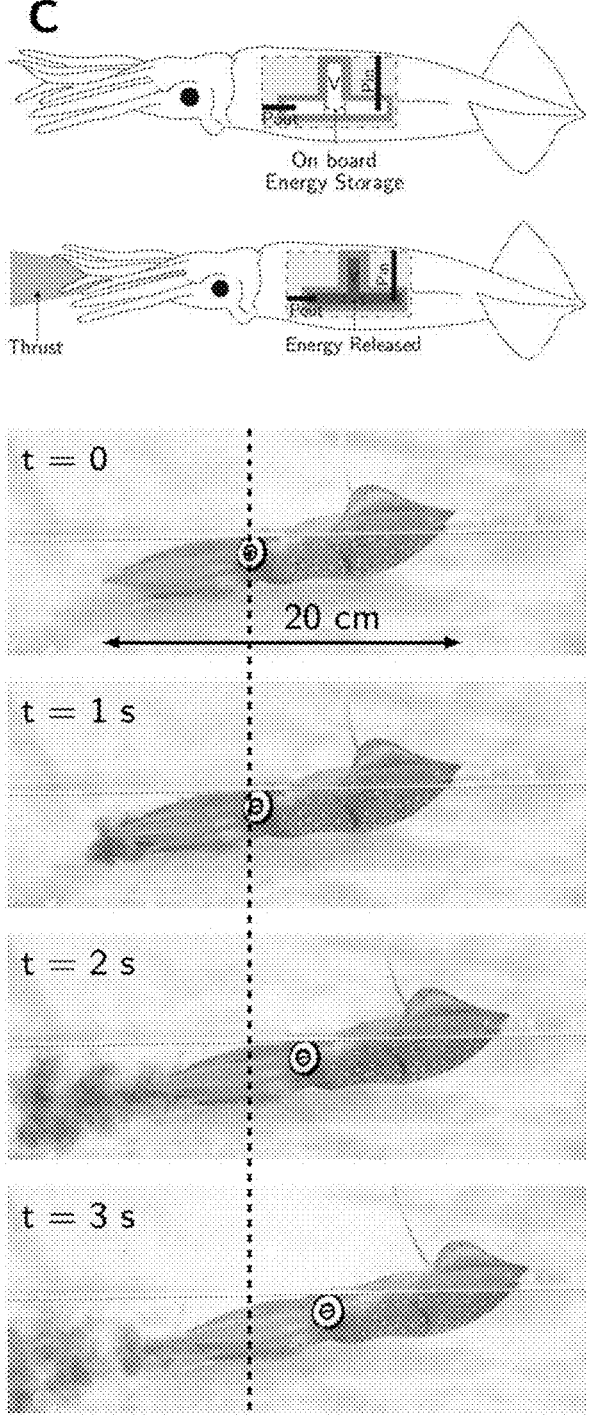

FIG. 3 illustrates energy storage using the two diodes in series. FIG. 3A illustrates charge/discharge cycles leverage the reconfigurability of the diodes. FIG. 3B illustrates Passive stability in each state allows charging and stable energy storage (P-V work). Energy is discharged by reconfiguring the output diode. FIG. 3C illustrates stored energy is discharged in an artificial squid, mimicking jet propulsion of cephalopods in nature.

Figure 4A:
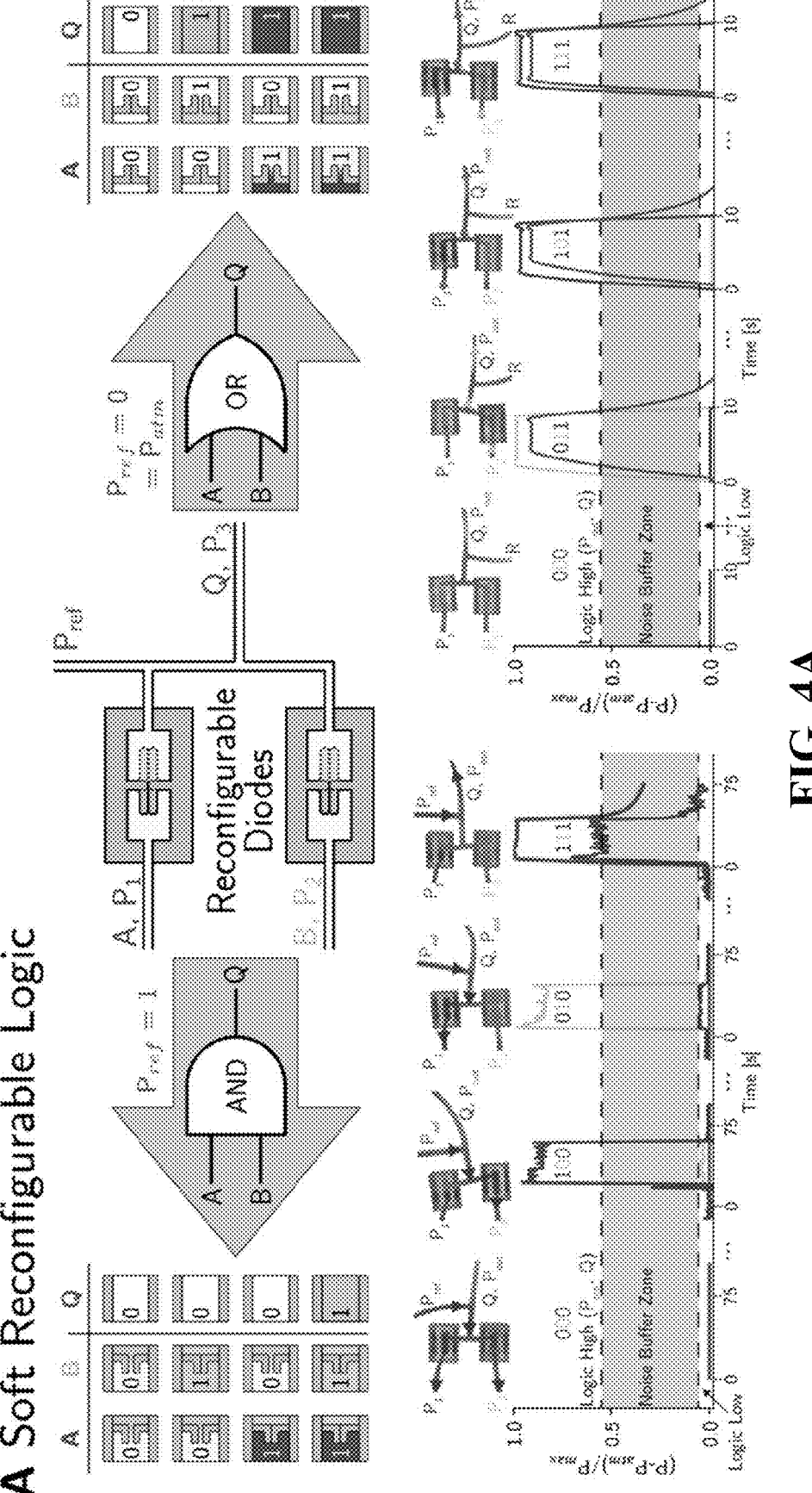
Figure 4B:
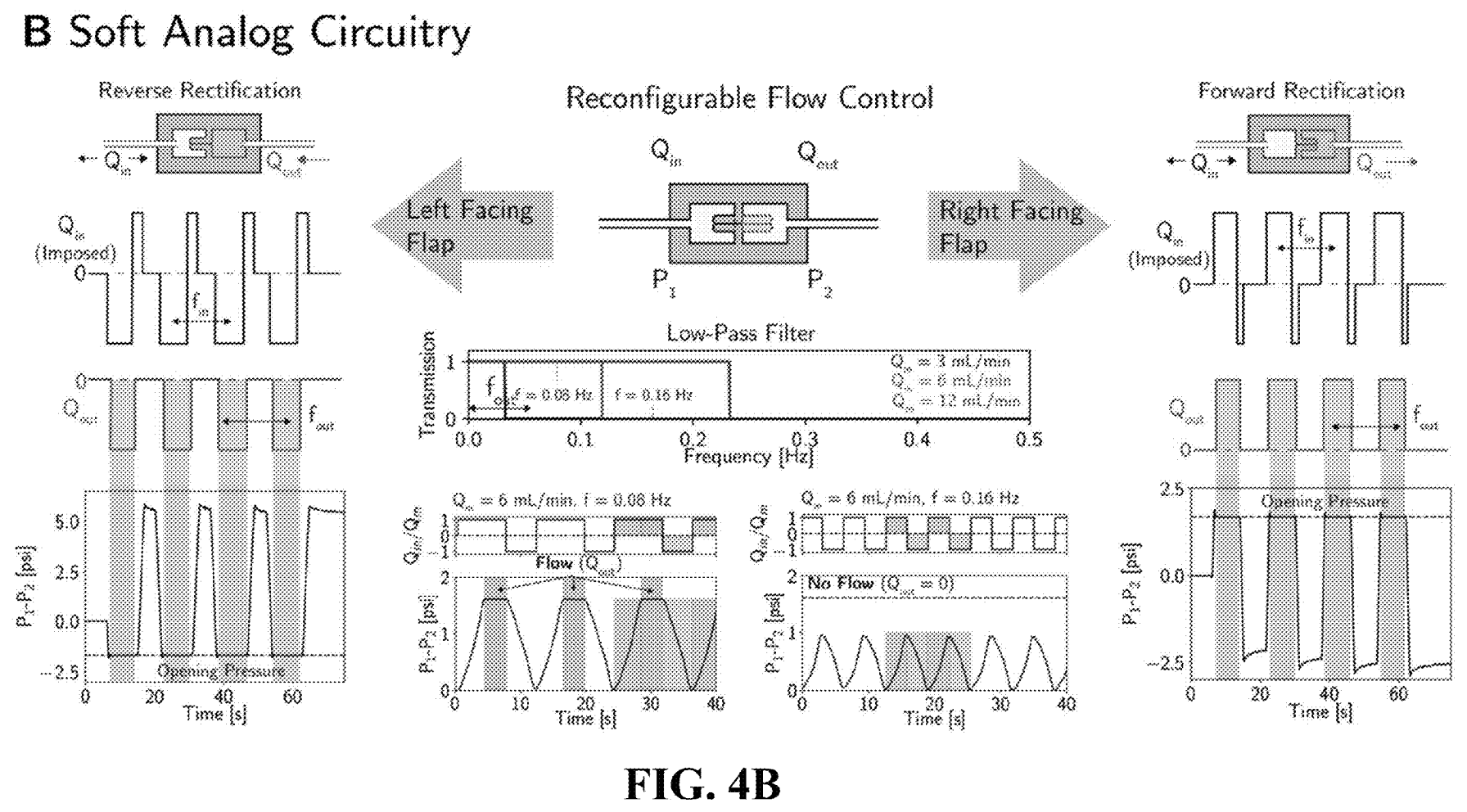

FIG. 4 illustrates reconfigurable digital logic using two soft diodes in parallel. FIG. 4A illustrates combinations of diodes can be connected to form elementary digital logic gates (AND, OR) and be reconfigured on demand by changing the orientation of the leaflets. FIG. 4B illustrates the diode can also rectify and filter analog signals (e.g., pressure and flow rates) depending on the orientation and geometry of the leaflets.

FIG. 5 illustrates a fabrication procedure used to manufacture soft diodes. Molds are filled with a desired elastomer (e.g., PDMS, Dragon Skin™ 10, etc.) and cured (step 1). Each mold encompasses half of the diode cross-section. Cured molds are extracted (step 2), painted with an elastomer (step 3), clamped, and cured to create a bonded diode (step 4). It is noted that the elastomer is only applied to edges of the channel and not the leaflets to ensure that the device is sealed but that flow is allowed through the valve.

The basic function of the fluidic diode in regulating the direction of flow, coupled with its programmable bistability and modularity, is leveraged here to enable the efficient design of multifunctioning material systems. For example, reprogramming the orientation of two fluidic diodes assembled in series enables the basic functions of pumping (both in state 1 or state 2, fluid displacement or motion, FIG. 2) and energy storage and release (state 1 and state 2, metabolism, FIG. 3), while state-switching of a diode pair assembled in parallel enables the elementary logic operations AND (state 1) and OR (state 2) to mimic "thinking" (FIG. 4A). Similarly, reconfiguring a single diode enables both filtering and rectification of fluid flow (i.e., information transfer, FIG. 4B, SI). The functions enabled by programming the simple, passive diode components minimize operational energy expenditures in soft artificial systems to achieve complex behavior with efficiency, compactness, and modularity to mimic life.

While the idea of programmable multifunctioning systems has been demonstrated previously in electronic circuits (i.e., field programmable gate arrays) where hardware (i.e., individual logic blocks) can be reconfigured to program different functions on-demand, implementation in soft artificial systems is lacking. The continuous deformation afforded by soft (elastomeric) materials is well-suited to perform the range of complex functions for artificial systems to mimic life. So far, soft matter integrated with responsive elements (e.g., light-sensitive polymers[6], hydrogels[13-15] etc.) have been limited to achieving single specialized functions (e.g., self-folding[16,17], change shape[18,19], etc.). Examples of specialized soft systems controlled by external electromagnetic forces and applied pressures include stretchable pumps[20-22], artificial muscles fluidic computation components (e.g., ring oscillator[29], logic gates[30], circuit components[31-33]), and material actuation,[34,35] but lack multifunctioning capability. A soft matter component that can be used to implement multiple functions (e.g., actuate, compute, and store energy) by leveraging mechanical programmability is still missing and is necessary to enable efficient design and autonomous complexity in future artificial material systems.

2. Results & Discussion

To enable multifunction in soft matter, we develop an elastomeric bidirectional fluidic diode that is programmable to regulate fluid flow passively in two orientations (i.e., each orientation acts as a one-way valve that operates without external energy input, FIG. 1). Importantly, our soft fluidic diodes are distinguished by a pair of elastomer leaflets whose states switch dynamically between two distinct states (state 1 and state 2, FIG. 1B) in response to pressure signals. This reconfigurability enables programmable changes in system function without rearranging the fluidic circuit. Here, multifunction results from reconfiguring the state of individual diodes that are assembled in networks by modulating the direction of information transfer (i.e., flow). The elastomeric diodes (PDMS, Dragon Skin™ 10, Dragon Skin™ 30) comprise a flow channel (diameter D~4 to 8 mm) embedded with a pair of valve leaflets (thickness t~400 to 800 μm, overlaps δ~1 to 3 mm, FIG. 1) that control the magnitude (zero or positive) and direction of flow (forward and backward). The valve leaflets are thin membrane sheets (rectangular protrusions larger than half the cross-section of the channel) that when compressed together, deform into two portions: one that lies along the cross-section of the channel and obstructs flow (i.e., cross-sectional portion), and another that lies along the axis of the channel (i.e., an overlapped region with overlap length δ) that rectifies flow, defines diode states, and enables passive bistable memory (i.e., maintaining the state by elastically deforming within the geometric constraints of the channel). The form and structure of the diode is inspired by venous valves where blood flow is regulated in a single direction to prevent backflow of blood due to gravity[36,37] (FIG. 1A), however a key distinction is in the bistability of the diode (FIGS. 1B-C). Whereas venous valves, and likewise duckbill valves that were inspired by valves in the vasculature, consist of a single continuous mass, construction of the fluidic diode using two separate leaflets allows for reversals in the direction of the overlaps and thus bidirectionality.

Material memory (i.e., stable configuration of the leaflets due to elastic deformation and geometric constrains of the channel) in the diode enables passive flow modulation without external energy input. The function of the diode relies on a compressive stress that deforms the valve leaflets to rectify flow in the channel passively (FIG. 1). For a given state (FIG. 1B), information transfer is controlled by the alignment and magnitude of the imposed pressure gradient, $\Delta P = P_1 - P_2$, relative to the orientation (direction) of the leaflet overlaps and the force required to overcome material compression from the geometric constraints imposed (i.e., characteristic opening pressure of the diode, $P_o$). For instance, $\Delta P$ applied in the direction opposing the orientation of the overlap prevents information transfer. For $\Delta P$ applied in the same direction of the overlap, two different regimes of information transfer are possible: no flow where the imposed pressure gradient is less than the characteristic opening pressure of the diode ($\Delta P < P_o$), and flow otherwise ($\Delta P \geq P_o$).

To transform between the two different states (FIG. 1C), we impose a pressure gradient in the direction opposing the leaflet overlap. As pressure is applied, the normal force exerted onto the valve leaflets closes the overlaps onto one another and deforms the remainder of the leaflets (i.e., the cross-sectional portion that obstructs flow). Keeping the overlaps compressed allows further pressure buildup to elastically deform the thin leaflets. Deforming the cross-sectional portion of the valve leaflets out of its original resting position expands the volume and surface area of the pressurized chamber, and therefore reduces the contact area between the overlapping portion of the two leaflets. The process continues until the overlapping area is reduced to zero (i.e., $-\Delta P = P_f$, flipping pressure), at which point momentum and material elasticity flip (i.e., reconfigure) the overlaps to its alternate stable orientation (i.e., State 2, FIG. 1B).

For sufficiently large channel diameter to leaflet length and thickness ratios (D/δ, D/t), the device is approximated as a two-dimensional system. Edge effects (i.e., interactions between the leaflets and the wall channel), however, remain important as the edges of the leaflets are forced into contact with the channel walls because of the compressive forces applied by the channel geometry. Interactions between the edges of the leaflets and the channel walls (i.e., surface adhesion) result in local resistances to slip between the surfaces in contact. During opening of the valve, the edges of the leaflet overlaps experience additional forcing into the channel walls and are therefore pinned to the channel wall (i.e., act as a fixed boundary condition). During reversal of leaflet direction (flipping), however, the edges of the leaflet overlaps are pulled away from the channel walls by the material strength of the polymer. Edges of the cross-sectional portions of the leaflets are pinned at the wall, and deformation due to an opposing pressure gradient during flipping causes a curved leaflet surface (FIG. 2B).

Figure 7:
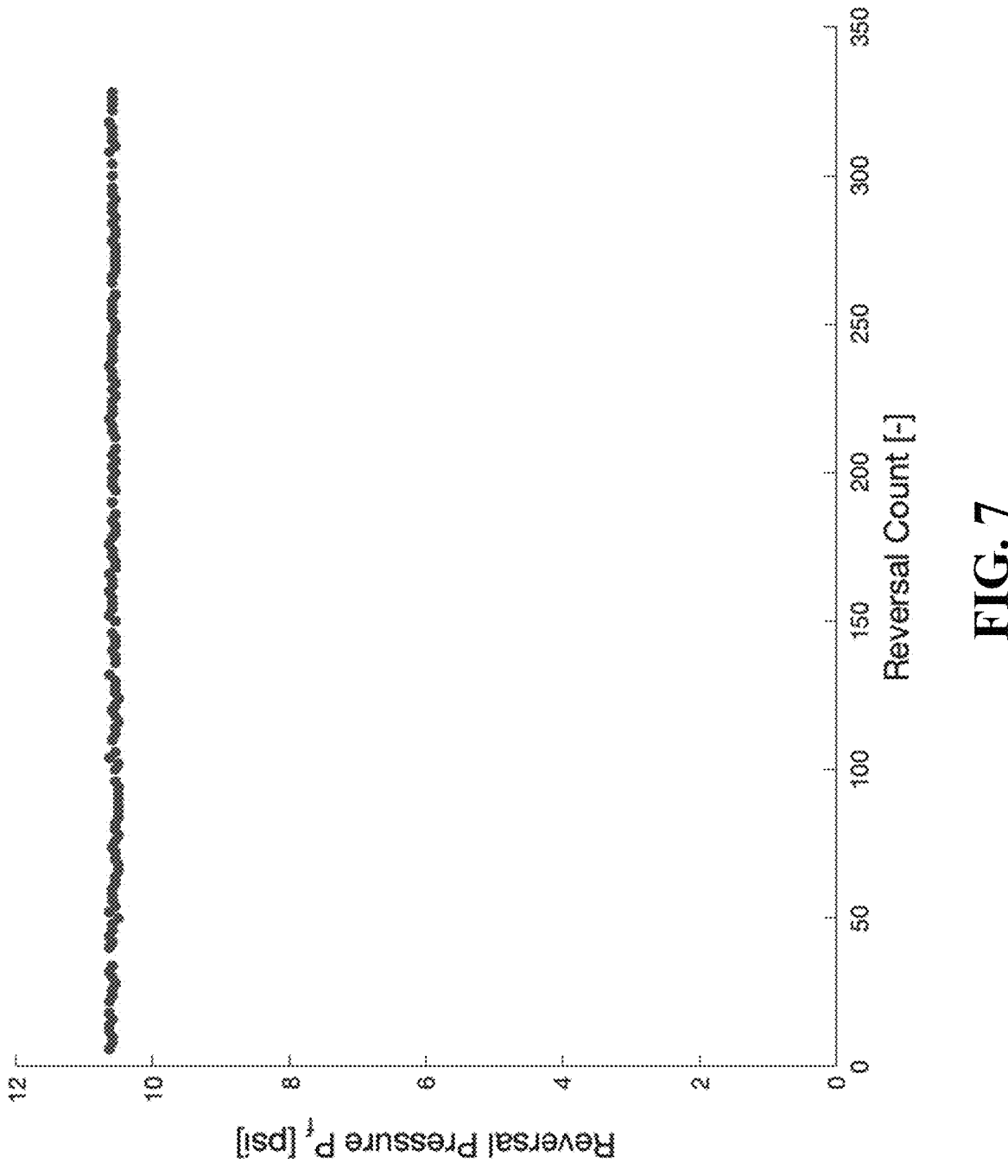
FIG. 7 shows a plot of the flipping pressure, Pf, over the course of 330 direction reversals according to exemplary embodiments of the present disclosure.

FIG. 7 illustrates a plot of the flipping pressure, Pf, over the course of 330 direction reversals. The valve had leaflet thickness t~600 μm and overlap δ~2 mm, channel diameter D ~6 mm, and was constructed of Sylgard 184 (PDMS). The pressure pulse used was generated by a constant flow rate of 1 mL/s.

Figure 8:
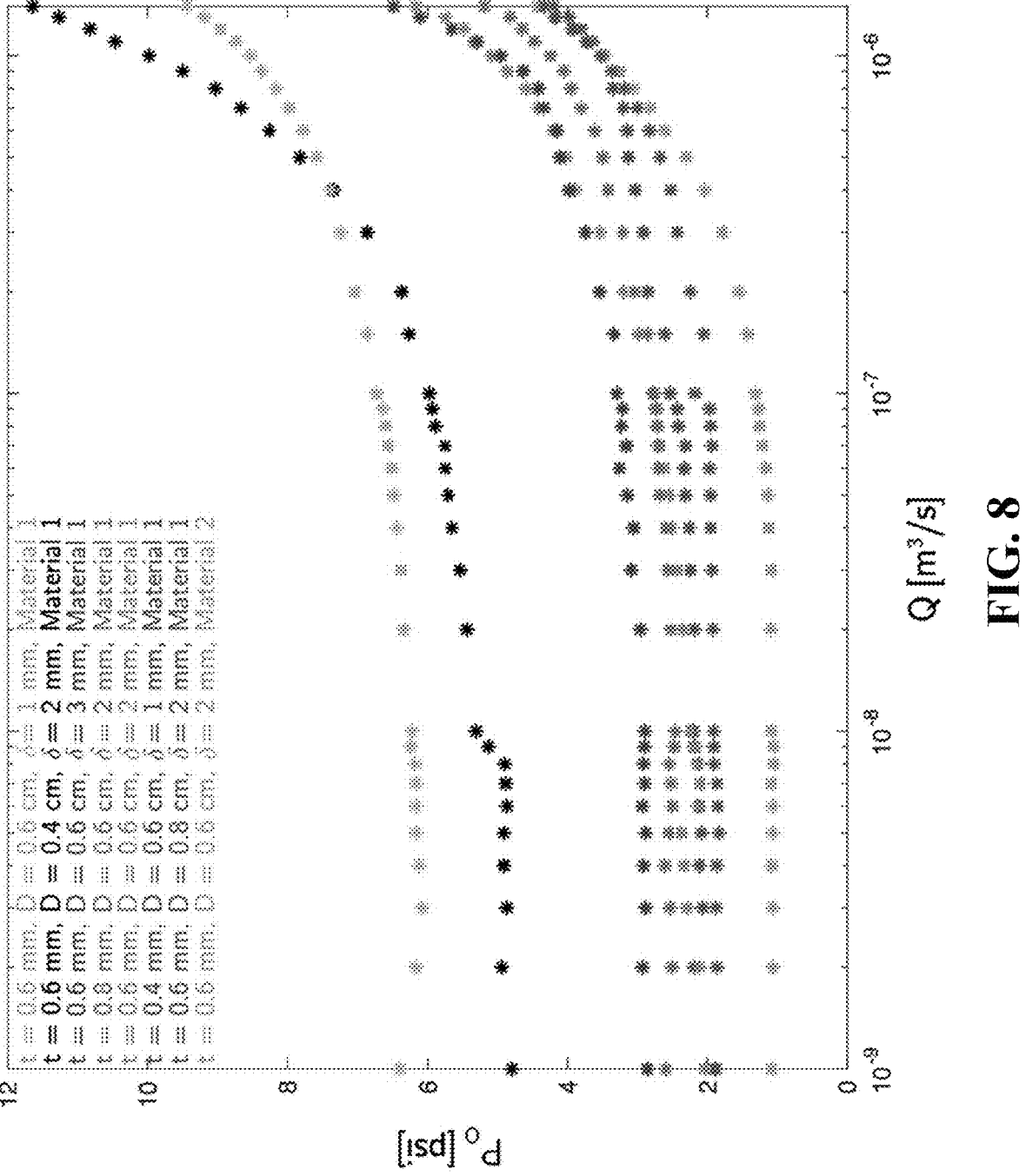
FIG. 8 shows a plot of the opening pressure, Po, as a function of imposed volumetric flow rates, Q, for different leaflet geometries and valve materials according to exemplary embodiments of the present disclosure.

FIG. 8 illustrates a plot of the opening pressure, $P_o$, as a function of imposed volumetric flow rates, Q, for different leaflet geometries and valve materials. Each data point was averaged across three separate trials. Valve characteristics corresponding to leaflet thicknesses t~0.4 mm to 0.8 mm, channel diameters D~0.4 cm to 0.8 cm, leaflet overlaps δ~1 mm to 3 mm, and silicone elastomer materials including Sylgard 184 (1) and Dragonskin 10 (2) were examined.

FIG. 9A illustrates a depiction of energy storage using soft diodes. Energy can be stored from (1) the expansion of elastic walls of the storage volume and (2) compressibility effects of the fluid medium. FIG. 9B illustrates measured P-V diagram of the charging process. Two PDMS diodes (Sylgard 184, D=6 mm, t=600 μm, and δ=2 mm) stored approximately 0.76 mJ of energy after injecting approximately 1 mL of water.

Figure 10:
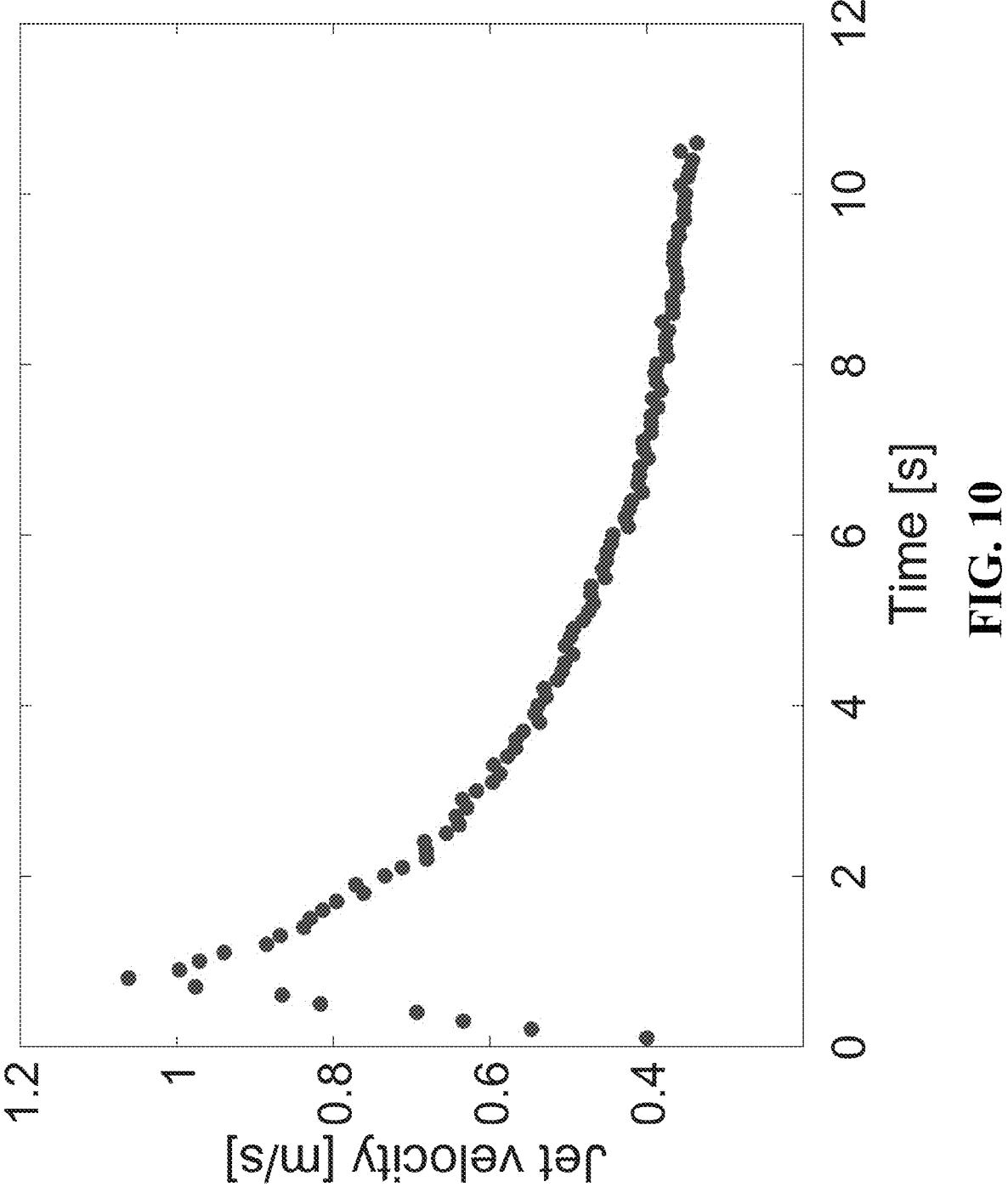
FIG. 10 shows a plot of the jet velocity resulting from the release of ~76 mJ of energy from a pair of cascaded soft diodes as a function of time according to exemplary embodiments of the present disclosure.

FIG. 10 illustrates a plot of the jet velocity resulting from the release of approximately 76 mJ of energy from a pair of cascaded soft diodes as a function of time. Each diode was molded using Sylgard 184 and featured a leaflet thickness of 0.6 mm, channel diameter of 6 mm, and leaflet overlap of 2 mm.

Reliability in the reversal characteristics of the bidirectional valve is required to program soft artificial materials to mimic life processes. The characteristics that control reversal between the two states is dependent upon the valve geometry (i.e., leaflet thickness and overlap, channel diameter), material elasticity, and the pressure pulse applied. For the valve in FIG. 1C (PDMS, thickness t~600 overlap δ~2 mm, channel diameter D~6 mm, $P_{flip}$~10.585 psi), the valve maintained a constant flipping pressure of $P_{flip}$=10.585±0.035 psi over the course of ~330 reversals (FIG. 7). Each state reversal occurred over ~0.29 s when using a pressure pulse generated by a constant flow rate of 1 mL/s. The reliability and rapid rate of state switching leads to advantages in using the bidirectional diode in "thinking", "motion", and "metabolism" in soft material systems, where the rate of "processing information" is limited by the rate at which data signals (i.e., pressure pulses) are supplied.

To enable multifunction behavior at an array of scales, we tune the characteristics of the device by controlling its opening and flipping pressures ($P_o$, $P_f$, FIG. 1D). We perform dimensional analysis on the opening pressure of a series of bidirectional soft valves with varying dimensions and elasticity to show that the flow modulation characteristics of the diodes can be described by four dimensionless groups comprising the leaflet geometry (thickness, t, and length of the overlap, δ), channel diameter, D, material elasticity, $E_y$, and hydrodynamic properties of the working fluid (flow rate, Q, fluid viscosity, μ, density, ρ) (FIG. 1D, inset, and FIG. 8). The tunability of the diodes, in addition to their bistability and programmable reconfigurability, offers a new method to modulate information transfer in different directions and leads to the construction of artificial systems capable of complex multifunctional behavior.

We demonstrate the multifunction performance of assembled fluidic diode networks using series and parallel fluid circuits. In series, two identical diodes (e.g., same geometries and elasticity) yield a soft reconfigurable pump (FIG. 2) and a soft energy storage system (FIG. 3) depending on the orientation (i.e., state) of the diodes. When both diodes are oriented in the same direction, the circuit becomes a mechanical soft pump where the two diodes isolate three separate chambers (FIG. 2A): an input chamber that supplies fluids (i.e., input information, $P_{in}$) for refilling the pump, an actuation chamber that generates pressure to displace fluids ($P_{mid}$), and an output chamber that delivers the displaced fluid (i.e., transmitted information, $P_{out}$) to a target. The pump described here operates similarly to one side of a mammalian heart: the ventricle (i.e., actuation chamber) is compressed to expel blood into the artery (i.e., output chamber), and relaxes to fill with blood from the atrium (i.e., input chamber, FIGS. 2A and 2D). Here, external forcing (i.e., mechanical compression) on the soft actuation chamber forces the chamber walls to deform, and the chamber contracts volumetrically (FIGS. 2A-B, actuation). The reduced volume corresponds to a positive pressure buildup that forces the input diode to close ($P_{mid}$>$P_{in}$) and the output diode to open and displace the fluid ($P_{mid}$>$P_{out}$. The rate of fluid displacement (i.e., flow rate) depends on the change in volume induced and the rate of actuation. To refill the pump, the external force is removed so that the elastic actuation chamber can restore its original shape and volume (FIGS. 2A-B, refill). The expansion in volume causes pressure to decline in the actuation chamber, imposing a positive pressure differential across the input diode (open, $P_{mid}$<$P_{in}$) and a negative pressure differential across the output diode (closed, $P_{mid}$<$P_{out}$) to allow fluids from the input chamber to fill the actuation chamber. Based on the fluidic load (i.e., resistance) of the circuit, this soft diode pump can be used to create either positive volumetric displacements (Q-mode, closed circuit) or generate a fixed output pressure (P-mode, open circuit, FIG. 2B). The displaced volume scales with the force applied to the actuation chamber, F, and the characteristics of the diodes (elasticity, geometry, FIG. 2C). It is possible to pump fluids in the reverse direction, as with the other side of the mammalian heart, by reprogramming the pump in situ. We demonstrate the bi-directional pump by applying a local pressure pulse to flip the orientation of both diodes (FIG. 2D). In doing so, the pump switches between operating as the "right" and "left" sides of the heart.

A second function of the two diodes in series allows for cyclic energy storage and discharge (FIG. 3). When the two diodes are oriented in opposing directions (i.e., the outlets of the diodes face each other), fluid (i.e., energy) injection through either diode causes a pressure buildup in the middle (i.e., storage) chamber ($P_1$<$P_2$>$P_3$) where the fluids cannot be released as in the pump. The increase in pressure in the storage chamber is stored pressure-volume work (P-V, FIGS. 3A-B). Energy storage is possible so long as the pressure differential across the valve is less than its characteristic flipping pressure ($|P_{1,3}$-$P_2|$<$P_f$). For the diodes described in FIGS. 1A-D, there was no loss in stored energy over a~hour period ($P_2$=const, FIG. 3B). To discharge the stored energy, the diode that is connected to a load is simply reversed. In a way, this system becomes a rechargeable soft energy storage system, where charge/discharge cycles are marked by programming the diodes in opposing (charge) or the same (discharge) orientations (FIG. 3B). The energy stored and discharged from such a system and the longevity of the "battery" depends on the storage cavity (volume and expansivity, SI), compressibility of the working fluid, diode flipping pressure, and elastic material properties, all of which are design parameters that can be tuned. For example, we achieve energy charge and discharge cycles of ~76 mJ/cycle by injecting/ejecting ~1 mL of water through the pair of PDMS diodes described in FIG. 5. Importantly, once assembled, the cycle health (i.e., number of charge/discharge cycles before losses in cycle efficiency) of the system depends only on the ability of the elastomeric material to withstand elastic deterioration. Recall, importantly, that the pressure required to reverse the direction of the diode remains constant $P_{flip}$~10.585±0.035 psi over 330 state reversals (FIG. 7).

The efficiency of the present energy storage and discharge cycle is $\eta=W_{net}/E_{in}$, where the net work out of the system is the energy stored less the energy required to reverse the valve ($W_{net}=E_{stored}-E_{flip}$)), and the energy input into the system is the sum of the energy stored, the energy required to flip the valve, and the energy required to open the valve ($E_{in}=E_{stored}+E_{flip}+E_{open}$). If we neglect the energy that is associated with opening the valve here, given that it is much smaller than the energy required to flip the valve and the energy stored, then the energy efficiency is $\eta\sim(E_{stored}-E_{flip})/(E_{stored}+E_{flip})$) and suggests that minimizing the flipping energy allows the storage efficiency to approach 100%. Following this analysis, approaches to maximize the energy efficiency is to (a) maximize the $E_{stored}$ by maximizing the volume of the storage vessel, or (b) minimize the $E_{flip}$, by increasing the channel diameter, decreasing the length and thickness of the valve leaflets, and using an elastomer with lower stiffness. We note, however, that the energy stored is the PV work of the system, and minimizing the flipping energy reduces the pressure that the storage vessel can withhold and thus reduces the amount of energy stored (i.e., tradeoff between energy stored and storage efficiency).

To demonstrate the utility of storing and dispensing energy using reconfigurable diode components in actuating soft artificial systems (i.e., to mimic metabolic processes), we emulate the jet propulsion of cephalopods (FIG. 3C). Cephalopods can swim at up to –2 m/s by expelling, through its siphon, a pressurized jet of water that is stored in its mantle cavity.[38] Here, we embed our soft energy storage circuit in the mantle of an artificial squid. We rely on the material memory and bidirectionality of the diode to carry out jet propulsion (i.e., energy discharge) in the artificial squid instead of muscle contractions. Using a diode-pair with ~76 mJ of stored energy, we achieved peak jet velocities of ~1 m/s by ejecting ~1 mL of water at a discharge rate of 0.35 W (volumetric energy density ~60 kJ/m$^3$, FIGS. 8-9). While the energy density achieved here is ~2 orders of magnitude less than that of other energy storage mechanisms such as pumped hydropower (~1800 to 5400 kJ/m$^3$), the key advantage offered here is in the modular-, soft-, and liquid-compatibility that enables interfacing with extreme environments (e.g., deep ocean, human-machine interface, etc.).

Beyond diode circuits in series, parallel networks of the reconfigurable components allow the field implementation (i.e., after assembly) of programmable computing. Logic operations performed by reconfigurable elementary logic gates (AND and OR) are possible by arranging two identical diodes in parallel (FIG. 4A). Each diode is connected to an input (A, B) on one side, and connected to the output (Q) on the other. A reference pressure is connected to the output to moderate the signal. Pressure is the logic variable that is 1 if the pressure differential exceeds the characteristic opening pressure (i.e., if fluid flows through) and is 0 otherwise. The OR operation is performed when both diodes are oriented toward the output and the reference pressure is atmospheric. In this configuration, if either or both of the input signals are 1 (i.e., input to diode A and/or B has $\Delta P>P_o$), then the input signal will be transmitted to the output ($Q=1$, $P_Q>P_o$). Conversely, if both input signals are 0 (i.e., input to both diode A and B are such that $\Delta P<P_o$), then no fluid signal is transmitted across the diodes and the output remains $Q=0$ ($P_Q<P_o$). Similarly, an AND gate is programmed by reconfiguring the diodes of the OR gate to face the input and by imposing a logic high (i.e., 1) to the reference pressure. In this case, the signal from $P_{ref}$ is dissipated through the diodes if any of the input signals are 0 (i.e., $\Delta P<P_o$), and therefore the output remains $Q=0$. In the case where both input signals are 1 (i.e., $\Delta P>P_o$), the high-pressure signal from $P_{ref}$ can no longer be dissipated, and the output becomes $Q=1$. The ability to reprogram the function of existing logic gates (i.e., switching between AND and OR functions) allows for in situ programming of logic gates and the imitation of "thinking" in artificial material systems to mimic life. The reliability of the pneumatic logic gates here is highlighted by the consistent flipping characteristics of the device (constant $P_{flip}$, ~10.585±0.035 psi over ~330 reversals).

Bidirectional stability in the soft diodes offers many opportunities toward achieving artificial life. The combination of signal filtering, rectification, and reconfigurability (FIG. 4B), allows for individual soft diodes to control and process information in environments that are not amenable to conventional electronics (e.g., human-machine interface, deep ocean environments, etc.). Each diode here is ablet to rectify information (pressure) signals by allowing unidirectional communication. Filtering of high-frequency noise (i.e., rapid pressure signals) is possible using the diodes described by either preventing flow in the case where the pressure gradient opposes the direction of the valve leaflets, or attenuating flow in the case where the pressure applied along the direction of the leaflets is small ($\Delta P<P_o$). Key advantages of the bidirectional diode here are that it is: (i) passive and does not require any external energy input to maintain its state or function, and (ii) bistable and allows programming after assembling the circuit, much like field-programmable gate arrays (FPGAs) in electronic circuits.

3. Conclusion

The demonstrations here show how soft, reconfigurable components can enable multifunctional behavior by allowing field programmability after assembly. Combining unique elastomeric states with passive flow control allows diodes to programmably switch between actuation and energy storage or computational operations depending on the state of the diode components. The modular reconfigurability and passive nature of the soft diode can lead to new classes of programmable materials for improved control and complex functions to achieve artificial life at the human scale. The advantage of using the valves here for applications such as propulsion, motion, and logic lies in their soft and liquid-compatible nature. For example, in extreme environments such as the deep sea where conventional electronics struggle (water-compatibility, vessel design to withstand high pressures), a soft, fluid-analog actuator provides the ability to leverage its surrounding environment for locomotion and sensing (e.g., valves are sensitive to pressure differentials and thus can be used to measure the depth of the device). Similarly, in systems that must be sensitive to forces (e.g., human-machine interface), a pneumatic set of logic gates such as those described here enables "sensing", which has been difficult to achieve to date.

4. Materials and Methods

Materials: Soft diodes were manufactured using a combination of silicone elastomers and Tygon tubing. Different silicone elastomers were used to quantify the effect of material elasticity (i.e., Young's modulus) on the properties of the diode. Each silicone elastomer was purchased commercially and used as received. Polydimethylsiloxane (PDMS) was purchased as a 0.5 kg Sylgard 184 kit from Ellsworth Adhesives. Dragonskin 10 (Medium) and 30 were purchased from Smooth-On, Inc. The elastomers were prepared following industrial protocols (see fabrication section for specifics). Tygon tubing with a ¹⁄₁₆″ (0.16 cm) ID and ⅛″ (0.32 cm) OD was purchased from McMaster-Carr.

Water soluble dyes were used to visualize fluid flow between diodes. A combination of Brilliant Blue FCF, Allura Red AC, Fast Green FCF, and Tartrazine were purchased in a concentrated aqueous form (20 mL) by Aldon and delivered through VWR. Between 50-500 μL of each dye was added to 20 mL of water to adjust the contrast of each solution.

Soft Diode Fabrication: The diodes were fabricated using a custom soft lithographic procedure (FIG. 5). The procedure was optimized to enable reproducible and simple diode fabrication that spans multiple scales (i.e., channel diameter, leaflet thickness, etc.). Assembly took place over four distinct steps to mold, cure, and bond the diode using elastomeric materials. We demonstrate that this procedure enables extracting (without tearing) the valve leaflets with widths <400 um and aspect ratios (i.e., channel diameter/leaflet width)<0.1.

The soft diodes were fabricated in stages by casting elastomers on 3D printed molds (FIG. 5). Each mold was printed by a Stratasys Objet30 Polyjet 3D Printer using Vero Family Acrylic materials. The printer has a spatial resolution of ~100 μm that is smaller than the leaflet dimensions considered in this work. Following printing, each mold was conditioned at 60° C. for 72 hours to ensure that elastomers did not stick to the mold. Molds that were not conditioned resulted in torn leaflets during extraction. Each mold was designed in CAD to cast half of a diode with a circular cross-section (i.e., a longitudinal slice). A rectangular slot was extruded and removed from the channel at the center of each mold, and the slot was filled with elastomer to create a leaflet. Each leaflet was longer than the radius of the channel that it was cast in to create leaflet overlaps that are required for flow rectification. Diode geometries characterized in the work include channel diameters between 4 and 8 mm, leaflet thicknesses between 400 and 800 μm, and leaflet overlaps between 1 and 3 mm.

Elastomers were used as received and prepared according to manufacturer specification. This process involved mixing a base and curing agent thoroughly for 30 minutes, degassing under vacuum (~100 Torr) for another 30 minutes, and pouring it in the mold. Sylgard 184 (PDMS) was used with a 10:1 ratio of base to curing agent and was cured in the mold at 60° C. for 6 hours. Dragon Skin™ 10 and 30 were used with a 1:1 mixing ratio and cured in the mold at room temperature for 16 hours (FIG. 5, step 1). Following curing, each elastomeric half-diode was extracted from the mold (FIG. 5, step 2), and holes were struck to enable flow. The mold was reused without additional treatment.

Cured components were next assembled into soft diodes. The outer edges of each half-diode were painted with a thin layer of uncured elastomer (of the same composition) so that when brought together and heated, the two half-diodes are bonded permanently (FIG. 5, step 3). Importantly, no elastomer was added to the leaflets to ensure that fluid flow is possible through the diode. To deform the leaflets as required in the valve, the half-diodes were subjected to a compressive force during curing (60° C. for 6 hours). We used a binder clamp (~4 N) to apply the external compression. Once cured, the diodes feature a pair of leaflets that are not bonded but remain in contact under a constant state of compressive deformation to allow for flow rectification and bistable reconfigurability.

Soft Pump and Energy Storage Fabrication: Soft pumps and energy storage devices were manufactured using the same procedure as described for the soft diode. Molds were designed that incorporate two soft diode leaflets using the same Objet30 Polyjet printer. A region in between the two leaflets was added to store energy and actuate the pump. The volume of this region (thickness a, length L, width b) was varied from 0.84 mL to >100 mL to store different amounts of energy. The wall thickness of this region was chosen to be 2.5 mm to allow deflection and the pumping of fluids by applying an external force. The same elastomers, treatment, conditioning, and extraction process was used as with single diodes. We found conditioning of the mold enabled the simultaneous extraction of many (>>1) leaflets without tearing.

Figure 6:
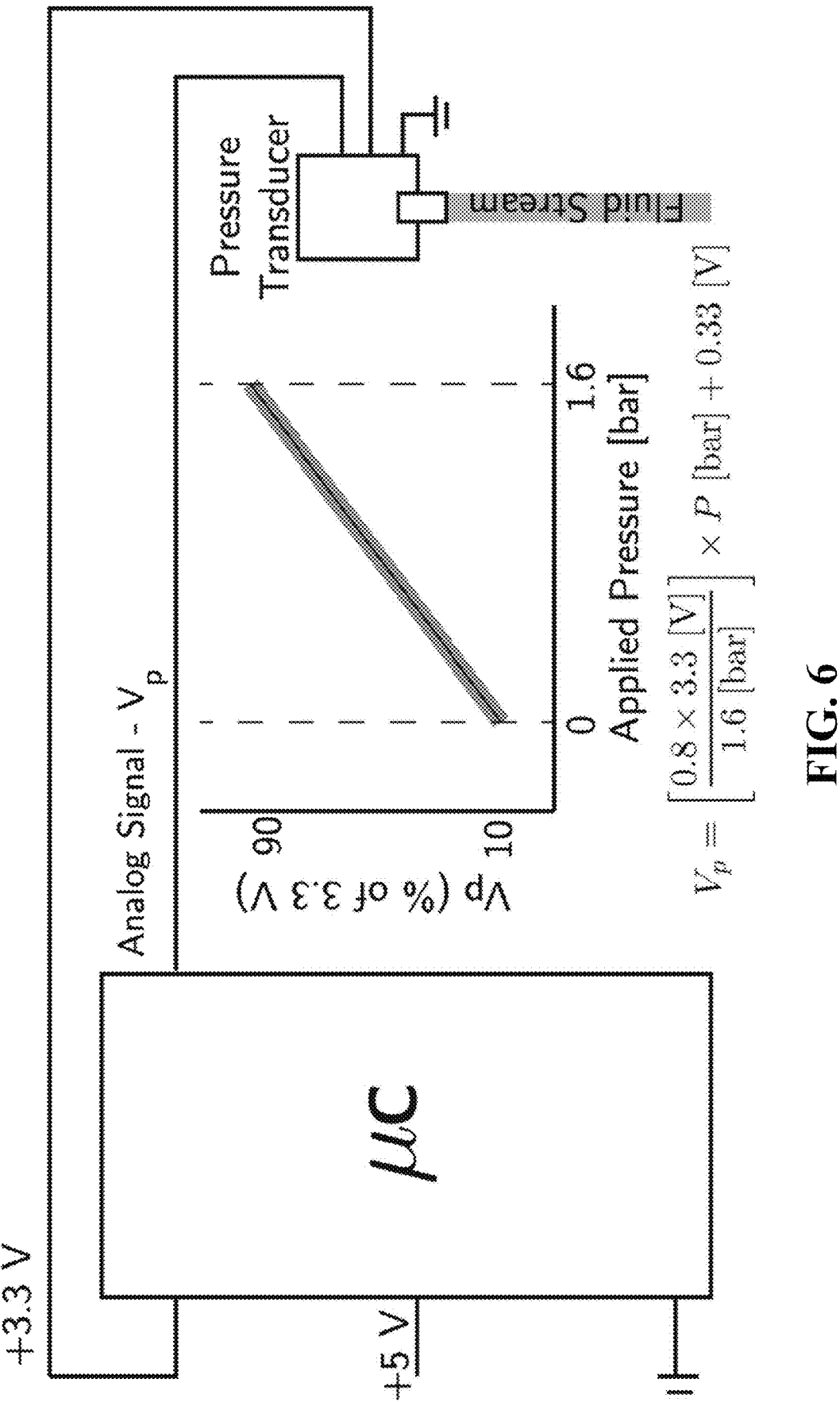
FIG. 6 shows an experimental setup used to measure fluid pressure throughout the study according to exemplary embodiments of the present disclosure.

FIG. 6 illustrates an experimental setup used to measure fluid pressure throughout the study. A combination of a pressure transducer (Honeywell SSCDRNT1.6BAAA3) and microcontroller (Arduino Uno) were used to convert fluid pressure into a voltage and record its value over time. The pressure transducer was separated calibrated to correlate fluid pressure with output voltage.

Pressure Measurements: Pressure was recorded using a combination of an Arduino Uno microcontroller and multiple Honeywell SSCDRNT1.6BAAA3 pressure transducers (FIG. 8). Each pressure transducer was a piezoresistive silicon sensor offering a ratiometric analog output for reading pressure up to a full-scale value of 1.6 bar. Each transducer had an internal vacuum reference, a hose connector for ¹⁄₁₆″ ID Tygon tubing, and had an output voltage proportional to the absolute pressure of the fluid stream. The linear factory calibration was independently confirmed by applying known fluid pressures and recording the output voltage.

Output voltages for the pressure transducers were recorded using the ADC on an Arduino Uno. The ADC featured a 10-bit (0-1023) resolution for measuring signals. A script was written for the microcontroller to sample up to 3 pressure transducers (i.e., for the input, middle, and output volumes of the pump) at rates between 10-100 Hz. This data was recorded using pySerial on a computer and saved in csv format.

Visual Data Collection and Processing: Image and video data of the diodes were collected using a USB microscope (Dino-Lite Edge AM 4115T-JV, Dino-Lite US, Torrance, CA) at magnifications of 10 to 220. Video data was recorded at 8 fps. The opening and closing of the diodes in each state was recorded by imaging the valve leaflets in the axial direction. Diode reconfiguration between the two states was recorded from the top of the diode to observe the deformation of the leaflets. System-level functions (e.g., pumping, energy storage, and logic) and their reprogramming were recorded similarly. Video of energy release was capturing using a Phantom V12 camera at 1280×800 resolution at 160 fps.

Quantification of the visual data was performed through image processing. Flow rates from the diode pump were quantified by measuring the displacement of water-air interfaces between adjacent image frames.

Force Characterization: Force measurements were performed using a combination of a precision balance and a force sensitive resistor (FSR). A Mettler-Toledo ME-T precision balance with a 3.2 kg capacity and a 0.01 g resolution was used to quantify the range of forces that were applied to actuate the pump. An Ohmite FSR01 resistor was configured in a voltage divider network to quantify the timescales over which the force was applied. The FSR featured a variable resistance that depended on the applied load, $R_{FSR}(F)$. Timescales were measured by recording the output voltage of the voltage divider circuit, $V_{out}=V_s/[1+R_{FSR}/R_M]$, using an Arduino Uno microcontroller with a sample rate up to 500 Hz. The measuring resistor, $R_M$, was varied between 3 kΩ and 100 kΩ to control the saturation force of the voltage divider. A constant supply voltage, $V_s$, of 5 V was used for analysis.

A soft pump was characterized by placing it on a precision balance with an FSR affixed on top. The balance was zeroed, and the force of mechanical actuations were recorded by logging the balance and recording the output voltage of the FSR voltage divider.

Statistical Analysis: Pressure and flow rate data collected in this work comprised of, at minimum, a sample size of 3 (i.e., three separate devices of the same configuration). Noise in the pressure data due to the precision of the pressure sensors (small, ~0.0429 psi) used was smoothed by calculating a moving average over 5 adjacent data points in time (Δt~0.143 s).

Dimensional Analysis of Soft Valve Opening

Buckingham it theory was applied to data that characterized the opening pressure across a series of soft valves with varying geometries and material properties. We find that the pressure across the valve required to open the valve for flow, $P_o$ [$ML^{-1}T^{-2}$], depends on the valve geometry (e.g., leaflet thickness, t [L], leaflet overlap length, δ [L], and channel diameter, D [L]), materials properties of the valve (e.g., material elasticity, E [$ML^{-1}T^{-2}$]), fluid properties (e.g., density, ρ [$ML^{-3}$], and viscosity, μ [$ML^{-1}T^{-1}$]), and flow conditions (e.g., flow rate, Q [$L^3T^{-1}$]):

$$P_o=f(D,t,\delta,E,Q,\rho,\mu)$$

We choose the recurring set:

$$D=[L]\to[L]=D$$

$$\rho=[ML^{-3}]\to[M]=\rho D^3$$

$$Q=[L^3T^{-1}]\to[T]=D^3/$$

to develop five H groups:

$$P_o=\left[\frac{M}{LT^2}\right]\to\Pi_1=\frac{(P_o)(D)(D^3/Q)^2}{\rho D^3}=\frac{P_o D^4}{\rho Q^2}$$

$$t=[L]\to\Pi_1=\frac{t}{D}$$

-continued $$\delta=[L]\to\Pi_2=\frac{\delta}{D}$$

$$E=\left[\frac{M}{LT^2}\right]\to\Pi_3=\frac{(E)(D)(D^3/Q)^2}{\rho D^3}=\frac{ED^4}{\rho Q^2}$$

$$\mu=\left[\frac{M}{LT}\right]\to\Pi_4=\frac{(\mu)(D)(D^3/Q)}{\rho D^3}=\frac{\mu D}{\rho Q}$$

such that the following relationship collapses the experimental data into a single linear relationship:

Energy Storage $$\frac{P_o D^4}{\rho Q^2}=\left(\frac{t}{D}\right)^{1/2}\left(\frac{\delta}{D}\right)^{-1/2}\left(\frac{ED^4}{\rho Q^2}\right)^{1/2}\left(\frac{\mu D}{\rho Q}\right)^1$$

The energy that can be stored in between a pair of soft diodes depends on the compressibility of the fluid medium (γ), expansivity of the storage cavity ($\Delta V_{exp}$), and the flipping characteristics of the diode (e.g., geometry and elasticity). Extractable energy can be calculated by tracking the work required to compress the fluid medium in the storage cavity and expand its elastic walls. This can be quantified as P-V work, $$W=\int_{V_o}^{V_f}PdV,$$

where dV includes the volume change in the storage cavity due to (1) fluid compressibility and (2) wall expansion. The amount of energy storage was measured using a pair of soft PDMS valves (Sylgard 184) (D=6 mm, t=600 μm, and δ=2 mm) with water as the liquid medium. This integral was evaluated by measuring the pressure change in the storage cavity as a known quantity of fluid was introduced WO using a syringe pump. We measured an injection of 1 mL of water resulted in a storage capacity of 0.76 mJ using the pair of diodes (FIG. 9).

Additional insight for the scalability of elastic energy storage can be described using a simple model. From the expression for P-V work, the amount of energy stored increases as the injected fluid volume increases. The injected fluid originates from volume changes due to the compressibility of the fluid ($\Delta V_c$) and the expansion of the storage cavity ($\Delta V_{exp}$), $\Delta V_f=\Delta V_c+\Delta V_{exp}$. This means strategies to increase either $\Delta V_c$ or $\Delta V_{exp}$ by using more compressible fluids (i.e., gases) or more expansive storage cavities are pathways to store more energy.

To show this, we consider storing energy with a liquid (i.e., water) that has an approximately constant compressibility (γ=con.) over the ranges of pressure considered (P<~2 bar). Other working fluids, such as gases, can be interpreted by substituting an appropriate equation of state into the expression for P-V work. Given the low compressibility of water, we approximate the process of energy storage by decoupling the effects of fluid compression and wall expansion, $dV=dV_c+dV_{exp}$. This gives some insight into ways to increase the storage density without needing to acquire experimental data or integrate numerical simulations. If we further assume the expansion of the storage volume occurs at approximately uniform pressure, then W becomes, $$W = \int_{V_o}^{V_f} PdV_c + \Delta P \Delta V_{exp}.$$

For water with $\gamma$=con., the definition of compressibility ($\gamma = 1/\rho(\partial \rho / \partial P)$) can be solved to yield $\rho(p) = \rho_0(1 + \gamma P)$. We can use this process to approximate the first integral by assuming the applied force (i.e., injected pressure) acts as a piston to store energy in the compressible volume of the medium. If we assume this process is 1D (varies with h) with uniform area and mass is conserved in the compressible component of energy storage ($\rho(P)/\rho_0 = V_0/V(P) = h_0/h(P)$) then the pressure can be expressed as, $$p(V) = \frac{1}{\gamma}\left(\frac{h_0}{h(P)} - 1\right), \quad W \approx \Delta P\left(\frac{\gamma}{2}V_0\Delta P + \Delta V_{exp}\right),$$

where $$\frac{\gamma}{2}V_0\Delta P$$

represents the volume change due to compressible effects in a fluid volume and $\Delta P$ is the stored fluid pressure.

Energy Release

The energy discharged by a soft PDMS valve (Sylgard 184) with valve diameter of 6 mm, leaflet thickness of 600 μm, and valve overlap of 2 mm was calculated by imaging the jet of water released from the valve. Here, the soft valve discharged energy at an average rate of ~0.35 W (FIG. 9). The energy released is calculated by integrating the power, of the jet over the duration of release, $$W_{released} = \frac{1}{2}\rho A \int_t v^3 dt$$

where the cross-sectional area of the jet, A, is taken to be equal to the flow area of the tubing ($\frac{1}{16}$" inner diameter), and the density of water was 1000 kg/m$^3$. The average velocity v of the projectile jet was measured as a function of time by relating the kinematics of horizontal and vertical motion of the water jet (FIG. 10). For a point along the water jet, the horizontal and vertical displacements of the point relative to the nozzle are x(t)=V$\tau$ and $$y(t) = \frac{1}{2}g\tau^2,$$

respectively. We find that the velocity of the water jet exiting the nozzle is:

$$v(t) = \frac{x(t)}{\sqrt{\frac{2y(t)}{g}}}.$$

Digital Logic in Soft Systems

Diodes are used to create elementary logic gates (AND, OR). Each gate functions using pressure as a logic variable with two inputs (A and B), a reference pressure ($P_{ref}$), and an output (Q). In each gate, pressure is treated as the logic variable and is assigned a 1 if P—$P_{atm}$>$P_0$ (i.e., fluid moves forward) and a 0 otherwise. In the OR gate, each diode is oriented in the same direction (leaflets facing the output), has its output (Q) tied together, and is connected to atmospheric pressure ($P_{ref}$=$P_{atm}$) through a pull-down resistor (FIGS. 4A-B of main text). This means if, for instance, A=1 (diode input A has $P_A$—$P_{atm}$>$P_0$) and B=0, the applied pressure will open diode A and flow will move to the output ($P_Q$—$P_{atm}$>$P_0$, Q=1). Other combinations of inputs featuring a logic high input function similarly by enabling flow from the input to connect to the output by opening a soft diode. Similarly, if A=0 and B=0, then both diodes remain closed and $P_Q$—$P_{atm}$=0 which means Q=0.

The AND gate features two distinct changes, (1) the diodes are flipped and face the inputs and (2) the common output is tied to a "high" reference pressure ($P_{ref}$—$P_{atm}$>$P_0$). The output pressure does not flip either diode due to the difference in flipping and opening pressures ($|P_{in}$—$P_{ref}|$<$P_f$). This means if, for instance, A=1 (diode input A has $P_A$—$P_{atm}$>$P_0$) and B=0 ($P_B$=$P_{atm}$), the reference pressure will open diode B and flow will move from the output to input B. Other combinations of inputs featuring a logic "low" value function similarly by forcing output flow to the gate and capping the pressure below the logic high threshold on the output. This means the output pressure will be $P_Q$—$P_B$<$P_0$ and thus $P_Q$—$P_{atm}$<$P_0$ so Q=0. Similarly, if A=1 and B=1, then both diodes remain closed and $P_Q$—$P_{atm}$>$P_0$ which means Q=1.

Analog Circuitry in Soft Systems

Soft diodes can also contribute to the control and processing of information in material systems. Each diode can rectify (i.e., block specific directions) and filter high-frequency signals (i.e., flows with short transients) depending on the state it is in (FIG. 3B in main text). This could involve simply isolating signals from flowing in a particular direction or even eliminating sources of noise.

An advantage of these analog functions is that the computation occurs passively within the material system. There is no need for external power and no need for embedded electronics that complicate the system function and change the material properties. The diode is also able to be reconfigured to change its state and behavior while adding locally analog control in complex network assemblies.

The contents of the following references are incorporated by reference herein:

[1] J. D. Marth, Nat. Cell Biol. 2008, 10, 1015.

[2] T. A. Campbell, S. Tibbits, B. Garrett, Sci. Am. 2014, 311, 60.

[3] G. M. Whitesides, B. Grzybowski, Science (80-.). 2002, 295, 2418.

[4] R. M. Erb, J. S. Sander, R. Grisch, A. R. Studart, Nat. Commun. 2013, 4, 1.

[5] J. W. Boley, W. M. Van Rees, C. Lissandrello, M. N. Horenstein, R. L. Truby, A. Kotikian, J. A. Lewis, L. Mahadevan, Proc. Natl. Acad. Sci. U.S.A 2019, 116, 20856.

[6] Y. Liu, B. Shaw, M. D. Dickey, J. Genzer, Sci. Adv. 2017, 3, 1.

[7] Z. Ding, C. Yuan, X. Peng, T. Wang, H. J. Qi, M. L. Dunn, Sci. Adv. 2017, 3.

[8] A. B. Subramaniam, M. Abkarian, H. A. Stone, Nat. Mater. 2005, 4, 553.

[9] S. Sacanna, M. Korpics, K. Rodriguez, L. Colon-Melendez, S. H. Kim, D. J. Pine, G. R. Yi, Nat. Commun. 2013, 4, 2.

[10] Y. S. Cho, G. R. Yi, J. M. Lim, S. H. Kim, V. N. Manoharan, D. J. Pine, S. M. Yang, J. Am. Chem. Soc. 2005, 127, 15968.

[11] Y. Zhang, Z. Yan, K. Nan, D. Xiao, Y. Liu, H. Luan, H. Fu, X. Wang, Q. Yang, J. Wang, W. Ren, H. Si, F. Liu, L. Yang, H. Li, J. Wang, X. Guo, H. Luo, L. Wang, Y. Huang, J. A. Rogers, Proc. Natl. Acad. Sci. U.S.A 2015, 112, 11757.

[12] S. Janbaz, R. Hedayati, A. A. Zadpoor, Mater. Horizons 2016, 3, 536.

[13] E. Palleau, D. Morales, M. D. Dickey, O. D. Velev, Nat. Commun. 2013, 4, 2257.

[14] Y. Wang, Biomaterials 2018, 178, 663.

[15] R. Merindol, G. Delechiave, L. Heinen, L. H. Catalani, A. Walther, Nat. Commun. 2019, 10, 1.

[16] D. H. Gracias, Curr. Opin. Chem. Eng. 2013, 2, 112.

[17] Y. Mao, K. Yu, M. S. Isakov, J. Wu, M. L. Dunn, H. J. Qi, Sci. Rep. 2015, 5, 1.

[18] J. Wu, C. Yuan, Z. Ding, M. Isakov, Y. Mao, T. Wang, M. L. Dunn, H. J. Qi, Sci. Rep. 2016, 6, 1.

[19] H. Y. Jiang, S. Kelch, A. Lendlein, Adv. Mater. 2006, 18, 1471.

[20] M. Q. A. Rusli, P. S. Chee, R. Arsat, K. X. Lau, P. L. Leow, Sensors Actuators, A Phys. 2018, 282, 17.

[21] V. Cacucciolo, J. Shintake, Y. Kuwajima, S. Maeda, D. Floreano, H. Shea, Nature 2019, 572, 516.

[22] Q. He, S. Cai, Sci. Robot. 2021, 6, eabg6640.

[23] S. Li, D. M. Vogt, D. Rus, R. J. Wood, Proc. Natl. Acad. Sci. U.S.A 2017, 114, 13132.

[24] S. M. Mirvakili, D. Sim, I. W. Hunter, R. Langer, Sci. Robot. 2020, 5, eaaz4239.

[25] Y. Nakabo, T. Mukai, K. Asaka, In Smart Materials III, International Society for Optics and Photonics, 2004, pp. 132-144.

[26] C. Tawk, M. in het Panhuis, G. M. Spinks, G. Alici, Soft Robot. 2018, 5, 685.

[27] G.-Y. Gu, J. Zhu, L.-M. Zhu, X. Zhu, Bioinspir. Biomim. 2017, 12, 11003.

[28] U. Gupta, L. Qin, Y. Wang, H. Godaba, J. Zhu, Smart Mater. Struct. 2019, 28, 103002.

[29] D. J. Preston, H. J. Jiang, V. Sanchez, P. Rothemund, J. Rawson, M. P. Nemitz, W. K. Lee, Z. Suo, C. J. Walsh, G. M. Whitesides, Sci. Robot. 2019, 4, 1.

[30] D. J. Preston, P. Rothemund, H. J. Jiang, M. P. Nemitz, J. Rawson, Z. Suo, G. M. Whitesides, Proc. Natl. Acad. Sci. U.S.A 2019, 116, 7750.

[31] S. Miyashita, L. Meeker, M. Go, Y. Kawahara, D. Rus, In 2014 IEEE International Conference on Robotics and Automation (ICRA), IEEE, 2014, pp. 1446-1453.

[32] S. Song, S. Joshi, J. Paik, Adv. Sci. 2021, 8, 2100924.

[33] P. Rothemund, A. Ainla, L. Belding, D. J. Preston, S. Kurihara, Z. Suo, G. M. Whitesides, Sci. Robot. 2018, 3.

[34] B. Mosadegh, P. Polygerinos, C. Keplinger, S. Wennstedt, R. F. Shepherd, U. Gupta, J. Shim, K. Bertoldi, C. J. Walsh, G. M. Whitesides, Adv. Funct. Mater. 2014, 24, 2163.

[35] M. Wehner, R. L. Truby, D. J. Fitzgerald, B. Mosadegh, G. M. Whitesides, J. A. Lewis, R. J. Wood, Nature 2016, 536, 451.

[36] A. T. Bazin, N. Engl. J. Med. 1929, 200, 442.

[37] A. W. Caitlin, Valve. U.S. Pat. No. 2,642,259, US Patent, 1953.

[38] A. Packard, Nature 1969, 221, 875.

[39] Y. Ding et al. Liquid Air Energy Storage. in Storing Energy: With Special Reference to Renewable Energy Sources 167-181 (Elsevier Inc., 2016). doi:10.1016/B978-0-12-803440-8.00009-9.

[40]. P. Rothemund, A soft, bistable valve for autonomous control of soft actuators, Sci. Robot. 3, eaar7986 (2018) 21 Mar. 2018.

The invention claimed is:

1. A system comprising:

a flow channel comprising a fluid; and a valve disposed within the flow channel, wherein:

the valve comprises a first flexible member;

the valve comprises a second flexible member;

the first flexible member and the second flexible member are configured to move from a first position to a second position;

in the first position the first flexible member and the second flexible member are configured to permit fluid flow in a first direction and to restrict fluid flow in a second direction;

in the second position the first flexible member and the second flexible member are configured to permit fluid flow in the second direction and to restrict fluid flow in the first direction;

the first flexible member and the second flexible member form an overlap configured such that the overlap separates when the fluid flow has a pressure exceeding a pressure gradient formed from the overlap;

the overlap is configured such that the flexible members passively change positions bidirectionally to correspond to the direction of the fluid flow; and, the first flexible member and the second flexible member are configured to remain in the first position or the second position without an external energy input.

2. The system of claim 1 wherein:

the first flexible member and the second flexible member form a first overlap in the first position.

3. The system of claim 2 wherein the first flexible member and the second flexible member are configured to move from the first position to the second position upon application of a first pressure gradient of the fluid antiparallel to the first overlap.

4. The system of claim 1 wherein: the first flexible member and the second flexible member form a second overlap in the second position.

5. The system of claim 2 wherein the first flexible member and the second flexible member are configured to move from the second position to the first position upon application of a second pressure gradient of the fluid antiparallel to the first overlap.

6. The system of claim 1 wherein:

the valve is a first valve; and the system comprises a second valve disposed within the chamber flow channel;

the second valve comprises a third flexible member;

the second valve comprises a fourth flexible member;

the third flexible member and the fourth flexible member are configured to move from a third position to a fourth position;

in the third position the third flexible member and the fourth flexible member are configured to permit fluid flow in the first direction and to restrict fluid flow in the second direction;

in the fourth position the third flexible member and the second flexible member are configured to permit fluid flow in the second direction and to restrict fluid flow in the first direction; and the third flexible member and the fourth flexible member are configured to remain in the third position or the fourth position without an external energy input.

7. The system of claim 6 wherein:

the flow channel is an input-output flow channel; and the system comprises an actuation chamber in fluid communication with the input-output flow channel.

8. The system of claim 7 wherein:

the actuation chamber is configured to move the first flexible member and the second flexible member back and forth between the first position and the second position; and the actuation chamber is configured to move the third flexible member and the fourth flexible member back and forth between the third position and the fourth position.

9. The system of claim 8 wherein:

the actuation chamber is configured to move the first flexible member and the second flexible member back and forth between the first position and the second position via a pressure change of the fluid between the actuation chamber and the input-output flow channel; and the actuation chamber is configured to move the third flexible member and the fourth flexible member back and forth between the third position and the fourth position via the pressure change of the fluid between the actuation chamber and the input-output flow channel.

10. The system of claim 1 wherein:

the first flexible member extends more than halfway across the flow channel; and the second flexible member extends more than halfway across the flow channel.

11. The system of claim 6 wherein:

the third flexible member extends more than halfway across the flow channel; and the fourth flexible member extends more than halfway across the flow channel.

12. The system of claim 11 wherein:

the first flexible member and the second flexible member form a first overlap in the first position.

13. The system of claim 12 wherein the first flexible member and the second flexible member are configured to move from the first position to the second position upon application of a first pressure gradient of the fluid antiparallel to the first overlap.

14. The system of claim 11 wherein:

the first flexible member and the second flexible member form a second overlap in the second position.

15. The system of claim 12 wherein the first flexible member and the second flexible member are configured to move from the second position to the first position upon application of a second pressure gradient of the fluid antiparallel to the first overlap.

16. A method of controlling a flow of a fluid in a circuit, wherein:

the circuit comprises a plurality of valves, each comprising a first flexible member and a second flexible member configured to move from a first position to a second position;

each of the plurality of valves are configured to permit fluid flow in a first direction when the first flexible member and second flexible member are in the first position;

each of the plurality of valves are configured to permit fluid flow in a second direction when the first flexible member and second flexible member are in the second position;

the plurality of valves are each configured to remain in the first position or the second position without an external energy input;

the first flexible member and the second flexible member of each of the plurality of valves form an overlap in each of the plurality of valves;

the overlap separates when the fluid flow has a pressure exceeding a pressure gradient formed from the overlap;

the overlap is configured such that the flexible members passively change positions bidirectionally to correspond to the direction of the fluid flow; and, the fluid flow in the circuit is controlled by applying the pressure gradient of the fluid antiparallel to the overlap in one or more of the plurality of valves.

17. The method of claim 16 wherein:

the plurality of valves comprises a first valve and a second valve;

the first valve is located in a first input channel;

the second valve is located in a second input channel; and the first input channel and the second input channel are in fluid communication with an output channel.

18. The method of claim 17 wherein fluid flow in the output channel is permitted if the first valve is configured to permit fluid flow from first input channel to the output channel or if the second valve is configured to permit fluid flow from the second input channel to the output channel.

19. The method of claim 18 further comprising changing the configuration of either the first valve or the second valve such that fluid flow in the output channel is only permitted if both the first valve is configured to permit fluid flow from first input channel to the output channel and if the second valve is configured to permit fluid flow from the second input channel to the output channel.

20. The method of claim 19 wherein changing the configuration of the first valve comprises moving the first flexible member and the second flexible member of-the first valve from the first position to the second position.

21. The method of claim 19 wherein:

the first flexible member and the second flexible member of either the first valve or the second valve form overlap; and moving the first flexible member and the second flexible member of either the first valve or the second valve from the first position to the second position comprises applying a pressure gradient of the fluid antiparallel to the overlap.

22. The method of claim 17 wherein fluid flow in the output channel is only permitted if both the first valve is configured to permit fluid flow from first input channel to the output channel and if the second valve is configured to permit fluid flow from the second input channel to the output channel.

23. The method of claim 22 further comprising changing the configuration of either the first valve or the second valve such that fluid flow in the output channel is permitted if the first valve is configured to permit fluid flow from first input channel to the output channel or if the second valve is configured to permit fluid flow from the second input channel to the output channel.

24. The method of claim 23 wherein changing the configuration of the first valve comprises moving the first flexible member and the second flexible member of the first valve from the first position to the second position.

25. The method of claim 24 wherein:

the first flexible member and the second flexible member of either the first valve or the second valve form the overlap; and moving the first flexible member and the second flexible member of either the first valve or the second valve from the first position to the second position comprises applying the pressure gradient of the fluid antiparallel to the overlap.

\* \* \* \* \*